(12) United States Patent
Chun et al.

(10) Patent No.: US 8,437,413 B2
(45) Date of Patent: May 7, 2013

(54) METHOD FOR TRANSMITTING CODEWORD

(75) Inventors: Jin Young Chun, Anyang-si (KR); Bin Chul Ihm, Anyang-si (KR); Wook Bong Lee, Anyang-si (KR); Moon Il Lee, Anyang-si (KR); Sung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 505 days.

(21) Appl. No.: 12/676,602

(22) PCT Filed: Oct. 10, 2008

(86) PCT No.: PCT/KR2008/005990
§ 371 (c)(1),
(2), (4) Date: Mar. 4, 2010

(87) PCT Pub. No.: WO2009/048305
PCT Pub. Date: Apr. 16, 2009

(65) Prior Publication Data
US 2010/0172434 A1    Jul. 8, 2010

(30) Foreign Application Priority Data
Oct. 11, 2007   (KR) .................. 10-2007-0102728

(51) Int. Cl.
  *H04K 1/10* (2006.01)
  *H04L 27/28* (2006.01)
(52) U.S. Cl.
  USPC ....................................................... 375/260

(58) Field of Classification Search .............. 375/150, 375/260, 261, 267, 295, 299, 308, 346, 347; 370/206, 208, 328, 329, 341, 343, 344, 348, 370/491
See application file for complete search history.

(56) References Cited

U.S. PATENT DOCUMENTS

| | | | |
|---|---|---|---|
| 2002/0146085 A1* | 10/2002 | Morris ........................... | 375/365 |
| 2005/0094597 A1* | 5/2005 | Hwang et al. ................. | 370/329 |
| 2005/0195732 A1* | 9/2005 | Huh et al. ...................... | 370/206 |
| 2005/0265227 A1* | 12/2005 | Byun et al. ..................... | 370/210 |
| 2005/0286402 A1 | 12/2005 | Byun et al. | |
| 2007/0071075 A1 | 3/2007 | Yang et al. | |
| 2008/0205451 A1* | 8/2008 | Ramesh et al. ............... | 370/491 |
| 2009/0010238 A1* | 1/2009 | Barak et al. ................... | 370/342 |
| 2009/0141681 A1* | 6/2009 | Hwang et al. ................. | 370/329 |
| 2009/0303918 A1* | 12/2009 | Ma et al. ........................ | 370/315 |

\* cited by examiner

*Primary Examiner* — David C. Payne
*Assistant Examiner* — Syed Haider
(74) *Attorney, Agent, or Firm* — McKenna Long & Aldridge LLP (57) ABSTRACT

A method for transmitting a codeword through a subchannel consisting of a plurality of tiles in a wireless communication system in which one tile comprises a plurality of data subcarriers and at least one pilot subcarrier is provided. The method includes generating a codeword by assigning pilot symbols to the at least one pilot subcarrier in each tile, by assigning a first codeword symbol to some of the plurality of data subcarriers, and by assigning a second codeword symbol to the remaining data subcarriers, the codeword corresponding to the plurality of tiles, and transmitting the codeword. Resources on a frequency-time axis can be effectively used for transmitting various data or control information.

5 Claims, 8 Drawing Sheets

◯ : PILOT SYMBOL

◯ : 1st CODEWORD SYMBOL

◯ : 2nd CODEWORD SYMBOL

Fig. 9

1 : 1st CODEWORD SYMBOL
2 : 2nd CODEWORD SYMBOL
▨ : PILOT SYMBOL

METHOD FOR TRANSMITTING CODEWORD

This application is a 35 U.S.C. §371 National Stage entry of International Application No. PCT/KR2008/005990, filed on Oct. 10, 2008, and claims priority to Korean Application No. 10-2007-0102728, filed on Oct. 11, 2007, each of which is hereby incorporated by reference in its entirety as if fully set forth herein.

TECHNICAL FIELD

The present invention relates to wireless communications, and more particularly, to a method for transmitting a codeword on one subchannel.

BACKGROUND ART

In next generation multimedia mobile communication systems, which have been actively studied in recent years, there is a demand for a system capable of processing and transmitting a variety of information (e.g., video and radio data) in addition to providing the early-stage voice service.

Orthogonal frequency division multiplexing (OFDM) is a multiple-subcarrier modulation scheme in which data transmission is achieved by dividing a frequency band into a plurality of orthogonal subcarriers. The OFDM is one of noticeable core technologies in the next generation multimedia mobile communication systems. Orthogonal frequency division multiple access (OFDMA) provides multi-user multiplexing by combining the OFDM with frequency division multiple access (FDMA) or time division multiple access (TDMA) or code division multiple access (CDMA).

Additional physical channels exist to transmit uplink data in an OFDMA-based communication system. A fast feedback channel is a physical channel for transmitting uplink control information. A method for allocating partial usage of subchannels (PUSC) resources is used in the fast feedback channel. The control information transmitted through the fast feedback channel is various, such as, channel quality information (CQI) indicating a channel condition, precoding matrix information (PMI) of a multiple antenna system, rank information (RI), etc. The control information is transmitted periodically or occasionally for smooth communication between a base station and a user equipment.

In general, not many resources on a frequency-time axis are allocated to the fast feedback channel for transmitting the uplink control information. When information is transmitted with a limited radio resource, accuracy of the uplink control information is not guaranteed, and an expressible codeword is limited, which leads to insufficient operational flexibility. Moreover, when a user has to transmit a plurality of pieces of uplink control information through the fast feedback channel, a plurality of subchannels are allocated, resulting in increase of overheads.

Accordingly, there is a need for a method for transmitting a plurality of pieces of uplink data on one subchannel while increasing a size of data transmitted on one uplink subchannel.

DISCLOSURE OF INVENTION

Technical Problem

The present invention provides a method for transmitting a codeword on one subchannel.

Technical Solution

According to an aspect of the present invention, a method for transmitting a codeword through a subchannel consisting of a plurality of tiles in a wireless communication system in which one tile comprises a plurality of data subcarriers and at least one pilot subcarrier is provided. The method includes generating a codeword by assigning pilot symbols to the at least one pilot subcarrier in each tile, by assigning a first codeword symbol to some of the plurality of data subcarriers, and by assigning a second codeword symbol to the remaining data subcarriers, the codeword corresponding to the plurality of tiles, and transmitting the codeword.

According to another aspect of the present invention, a method for transmitting a codeword is provided. The method includes generating a single codeword by carrying a first codeword and a second codeword on a tile, the tile consisting of a plurality of contiguous subcarriers and a plurality of OFDM symbols, and transmitting the single codeword, wherein the number of subcarriers mapped with the first codeword symbol is equal to the number of subcarriers mapped with the second codeword symbol.

According to still another aspect of the present invention, a method for transmitting a codeword through a subchannel consisting of a plurality of bins in a wireless communication system in which one bin comprises a plurality of data subcarriers and at least one pilot subcarrier is provided. The method includes generating a codeword by assigning pilot symbols to the at least one pilot subcarrier in each bin, by assigning a first codeword symbol to some of the plurality of data subcarriers, and by assigning a second codeword symbol to the remaining data subcarriers, the codeword corresponding to the plurality of tiles, and transmitting the codeword.

Advantageous Effects

According to the present invention, resources on a frequency-time axis can be effectively used for transmitting various data or control information.

MODE FOR THE INVENTION

Hereinafter, exemplary embodiments of the present invention will be described in detail with reference to the accompanying drawings so that this disclosure can be thorough and complete, and will fully convey the concept of the invention to those skilled in the art.

Figure 1:
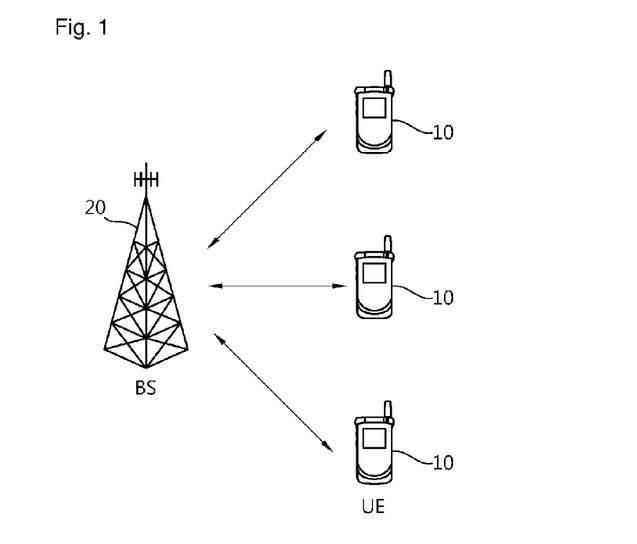
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes a base station (BS) 20 and at least one user equipment (UE) 10. The BS 20 is generally a fixed station that communicates with the UE 10 and may be referred to as another terminology, such as a node-B, a base transceiver system (BTS), an access point, etc. There are one or more cells within the coverage of the BS 20. The UE 10 may be fixed or mobile, and may be referred to as another terminology, such as a mobile station (MS), a user terminal (UT), a subscriber station (SS), a wireless device, etc.

A downlink represents a communication link from the BS 20 to the UE 10, and an uplink represents a communication link from the UE 10 to the BS 20. In the downlink, a transmitter may be a part of the BS 20, and a receiver may be a part of the UE 10. In the uplink, the transmitter may be a part of the UE 10, and the receiver may be a part of the BS 20.

Downlink and uplink transmissions can be made using different multiple access schemes. For example, orthogonal frequency division multiple access (OFDMA) may be used for downlink transmission, and single carrier-frequency division multiple access (SC-FDMA) may be used for uplink transmission.

There is no restriction on the multiple access scheme used in the wireless communication system. The multiple access scheme may be based on code division multiple access (CDMA), time division multiple access (TDMA), frequency division multiple access (FDMA), single-carrier FDMA (SC-FDMA), orthogonal frequency division multiple access (OFDMA), or other well-known modulation schemes. In these modulation schemes, signals received from multiple users are demodulated to increase capacity of the communication system.

Figure 2:
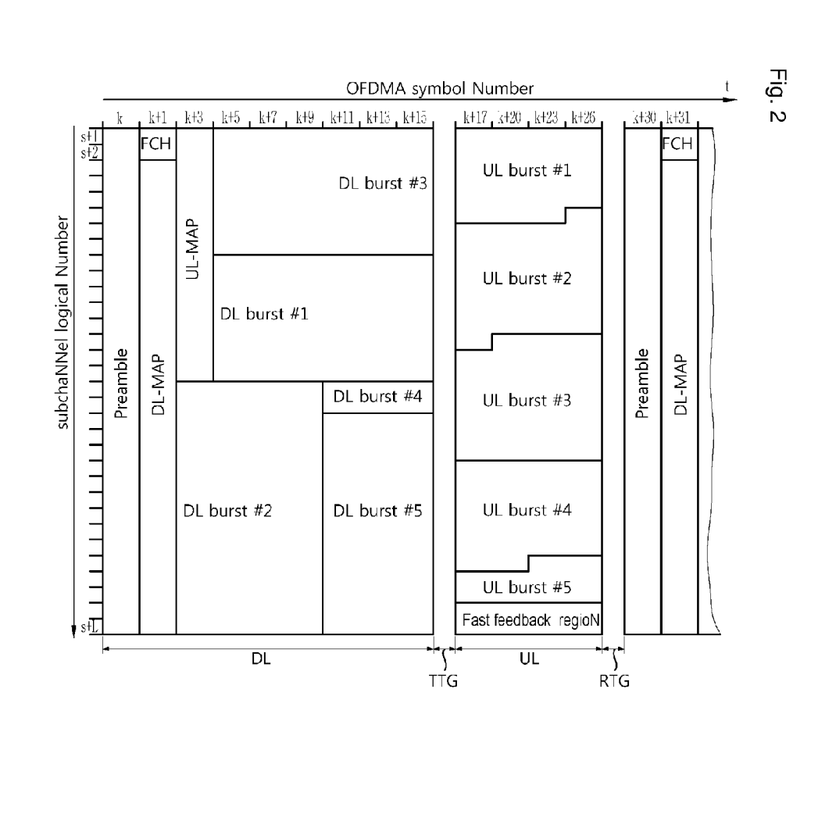
FIG. 2 shows an exemplary structure of a frame.

FIG. 2 shows an exemplary structure of a frame. The frame is a data sequence according to a physical specification in a fixed time duration. The frame may be an OFDMA frame.

Referring to FIG. 2, the frame includes a downlink (DL) frame and an uplink (UL) frame. In a time division duplex (TDD) scheme, UL and DL transmissions share the same frequency but are performed in different time periods. The DL frame is prior to the UL frame. The DL frame includes a preamble, a frame control header (FCH), a DL-MAP, a UL-MAP, and a DL burst region. The UL frame includes a UL burst region.

Guard times are provided to identify the UL frame and the DL frame and are inserted to a middle portion (between the DL frame and the UL frame) and a last portion (next to the UL frame) of the frame. A transmit/receive transition gap (TTG) is a gap between a DL burst and a subsequent UL burst. A receive/transmit transition gap (RTG) is a gap between a UL burst and a subsequent DL burst.

A preamble is used between a BS and a UE for initial synchronization, cell search, a frequency offset, and channel estimation. An FCH includes information regarding a length of a DL-MAP message and a coding scheme of the DL-MAP. The DL-MAP is a region where the DL-MAP message is transmitted. The DL-MAP message defines a connection of a DL channel. The DL-MAP message includes a configuration change count of a downlink channel descriptor (DCD) and a BS identifier (ID). The DCD describes a downlink burst profile applied to a current MAP. The downlink burst profile indicates characteristics of a downlink physical channel. The DCD is periodically transmitted by the BS by using a DCD message.

The UL-MAP is a region where a UL-MAP message is transmitted. The UL-MAP message defines a connection of a UL channel. The UL-MAP message includes a configuration change count of an uplink channel descriptor (UCD) and also includes an effective start time of UL assignment defined by the UL-MAP. The UCD describes a UL burst profile. The UL burst profile indicates characteristics of a UL physical channel and is periodically transmitted by the BS by using a UCD message.

A fast feedback region is included in a portion of the UL frame. The fast feedback region is allocated for faster UL transmission in comparison with general UL data transmission. The fast feedback region can carry channel quality information (CQI), acknowledgement (ACK)/negative-acknowledgement (NACK) signals, etc. The fast feedback region can be located in any link frames, and the position and size thereof are not limited to as shown in FIG. 2.

A slot is a minimum unit of possible data allocation, and is defined with a time and a subchannel. The subchannel may include a plurality of tiles in UL transmission. The subchannel may include six tiles. In UL transmission, one burst may include three OFDM symbols and one subchannel. In a partial usage of subchannel (PUSC) permutation, each tile may include four contiguous subcarriers on three OFDM symbols. That is, the tile has a two-dimensional resource structure including a time axis and a frequency axis. The PUSC subcarrier may include eight data subcarriers and four pilot subcarriers.

Hereinafter, a tile denotes a two-dimensional resource structure consisting of a plurality of contiguous subcarriers on consecutive OFDM symbols. Of course, any other terminologies may be used to represent the tile as long as it has the two-dimensional resource structure.

In an optional PUSC permutation, each tile may include three contiguous subcarriers on three OFDM symbols. The optional PUSC subcarrier may include eight data subcarriers and one pilot subcarrier. Tiles included in the subchannel are distributively deployed throughout a whole band. A bin includes nine contiguous subcarriers on an OFDM symbol. A band is a group of four rows of the bin. An adaptive modulation and coding (AMC) subchannel is composed of six contiguous bins in the same band.

Figure 3:
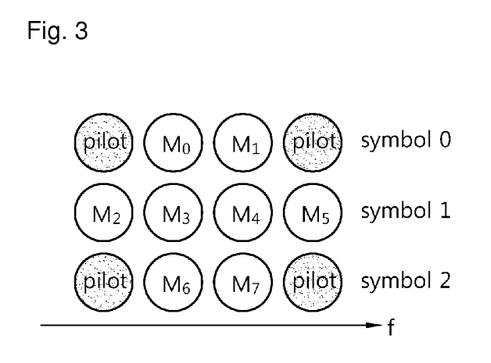
FIG. 3 shows an example of a tile for carrying data.

FIG. 3 shows an example of a tile for carrying data.

Referring to FIG. 3, one subchannel consists of six tiles. In a PUSC permutation, each tile may include four contiguous subcarriers on three OFDM symbols. The PUSC subcarrier may include eight data subcarriers and four pilot subcarriers. Data is carried on a data subcarrier. The data can be classified into user data and control information. A pilot signal or 'Null' can be carried on a pilot subcarrier. That is, one subchannel may include 48 data subcarriers, and may carry the data on the 48 data subcarriers.

In an optional PUSC permutation, each tile may include three contiguous subcarriers on three OFDM symbols. The optional PUSC subcarrier may include eight data subcarriers and one pilot subcarrier. Tiles included in the subchannel are distributively deployed throughout a whole band. A bin includes nine contiguous subcarriers on OFDM symbols. A band is a group of four rows of the bin. An AMC subchannel is composed of six contiguous bins in the same band.

Hereinafter, a method for transmitting a 6-bit codeword on one subchannel, a method for multiplexing the codeword with respect to a plurality of UEs, and a method of deploying data and pilots on subcarriers of a tile will be described. The subchannel may be an uplink subchannel for transmitting user data or may be a fast feedback channel for transmitting control information.

<Method for Transmitting Codeword on One Subchannel>

One subchannel includes a plurality of tiles. One tile includes a plurality of data subcarriers and at least one pilot subcarrier. To facilitate explanation, it will be assumed that one subchannel includes six tiles, and one tile includes eight data subcarriers and at least one pilot subcarrier on the basis of the PUSC permutation. A codeword symbol is a symbol carried on a data subcarrier of a tile. A pilot symbol is a symbol carried on a pilot subcarrier.

A transmitter allocates a 1st codeword symbol on some of a plurality of data subcarriers included in one tile and allocates a 2nd codeword symbol to the remaining data subcarriers. For one example, the transmitter may allocate the 1st codeword symbol to three data subcarriers and allocates the 2nd codeword symbol to five data subcarriers. For another example, by dividing data subcarriers in half, the transmitter may allocate the 1st codeword symbol to one half of the data subcarriers and allocate the 2nd codeword symbol to the other half of the data subcarriers. That is, in one tile, four data subcarriers transmit the 1st codeword symbol and the remaining four data subcarriers transmit the 2nd codeword symbol.

According to the aforementioned method, all data subcarriers included in one tile are allocated with two types of codeword symbols. Thus, by combining six tiles having such a structure, 64 6-bit codewords (i.e., 000000 to 111111) can be expressed. For clear explanation, the pilot subcarrier included in the tile will be omitted.

Table 1 below shows an example of a combination of 1st and 2nd codeword symbols for respective tiles corresponding to the 6-bit codewords. Six tiles having the combination of 1st and 2nd codeword symbols correspond to one 6-bit codeword. Since the codeword size is 6 bits, it is possible to generate 64 (i.e., $2^6$) different codewords.

TABLE 1

| 64 codewords | Tile0 | | Tile1 | | Tile2 | | Tile3 | | Tile4 | | Tile5 | |
|---|---|---|---|---|---|---|---|---|---|---|---|---|
| 000000 | P(8) | P(5) | P(8) | P(1) | P(7) | P(1) | P(3) | P(3) | P(7) | P(4) | P(4) | P(3) |
| 000001 | P(2) | P(2) | P(2) | P(1) | P(6) | P(5) | P(3) | P(8) | P(8) | P(3) | P(3) | P(1) |
| 000010 | P(5) | P(5) | P(5) | P(6) | P(8) | P(5) | P(3) | P(1) | P(2) | P(1) | P(4) | P(8) |
| 000011 | P(2) | P(7) | P(8) | P(7) | P(6) | P(2) | P(4) | P(6) | P(3) | P(2) | P(3) | P(3) |
| 000100 | P(6) | P(2) | P(3) | P(5) | P(8) | P(4) | P(4) | P(3) | P(6) | P(2) | P(5) | P(4) |
| 000101 | P(8) | P(6) | P(6) | P(1) | P(1) | P(8) | P(1) | P(3) | P(4) | P(2) | P(6) | P(8) |
| 000110 | P(4) | P(4) | P(8) | P(1) | P(8) | P(4) | P(7) | P(5) | P(6) | P(3) | P(7) | P(6) |
| 000111 | P(1) | P(6) | P(1) | P(3) | P(6) | P(4) | P(7) | P(3) | P(1) | P(6) | P(8) | P(7) |
| 001000 | P(8) | P(4) | P(1) | P(1) | P(3) | P(4) | P(1) | P(7) | P(3) | P(1) | P(5) | P(2) |
| 001001 | P(1) | P(7) | P(1) | P(2) | P(4) | P(1) | P(3) | P(8) | P(6) | P(1) | P(1) | P(8) |
| 001010 | P(8) | P(3) | P(4) | P(5) | P(6) | P(8) | P(2) | P(7) | P(6) | P(5) | P(1) | P(2) |
| 001011 | P(2) | P(1) | P(4) | P(7) | P(6) | P(2) | P(6) | P(3) | P(3) | P(8) | P(6) | P(7) |
| 001100 | P(3) | P(2) | P(5) | P(4) | P(8) | P(5) | P(6) | P(6) | P(8) | P(5) | P(1) | P(1) |
| 001101 | P(7) | P(1) | P(5) | P(3) | P(1) | P(1) | P(2) | P(2) | P(2) | P(4) | P(3) | P(5) |
| 001110 | P(6) | P(3) | P(2) | P(4) | P(3) | P(7) | P(7) | P(7) | P(8) | P(1) | P(7) | P(7) |
| 001111 | P(8) | P(2) | P(1) | P(4) | P(3) | P(4) | P(2) | P(4) | P(7) | P(4) | P(7) | P(1) |
| 010000 | P(3) | P(4) | P(7) | P(8) | P(2) | P(6) | P(6) | P(3) | P(2) | P(1) | P(1) | P(1) |
| 010001 | P(3) | P(6) | P(6) | P(4) | P(6) | P(1) | P(6) | P(1) | P(4) | P(7) | P(1) | P(3) |
| 010010 | P(3) | P(3) | P(5) | P(7) | P(4) | P(5) | P(7) | P(6) | P(4) | P(4) | P(5) | P(3) |
| 010011 | P(3) | P(3) | P(8) | P(4) | P(4) | P(8) | P(6) | P(4) | P(8) | P(7) | P(5) | P(3) |
| 010100 | P(3) | P(4) | P(2) | P(5) | P(1) | P(1) | P(7) | P(3) | P(5) | P(4) | P(3) | P(5) |
| 010101 | P(6) | P(5) | P(2) | P(1) | P(5) | P(4) | P(5) | P(8) | P(4) | P(5) | P(8) | P(1) |
| 010110 | P(2) | P(8) | P(1) | P(3) | P(8) | P(7) | P(6) | P(8) | P(8) | P(3) | P(6) | P(5) |
| 010111 | P(8) | P(8) | P(5) | P(7) | P(2) | P(5) | P(3) | P(5) | P(8) | P(8) | P(2) | P(8) |
| 011000 | P(4) | P(7) | P(2) | P(7) | P(4) | P(5) | P(3) | P(7) | P(6) | P(7) | P(5) | P(7) |
| 011001 | P(5) | P(7) | P(7) | P(4) | P(3) | P(4) | P(8) | P(2) | P(7) | P(1) | P(2) | P(7) |
| 011010 | P(8) | P(8) | P(5) | P(6) | P(2) | P(1) | P(6) | P(4) | P(6) | P(5) | P(8) | P(5) |
| 011011 | P(6) | P(8) | P(5) | P(1) | P(5) | P(8) | P(5) | P(2) | P(6) | P(5) | P(3) | P(8) |
| 011100 | P(4) | P(1) | P(8) | P(1) | P(7) | P(7) | P(8) | P(3) | P(3) | P(6) | P(7) | P(4) |
| 011101 | P(3) | P(4) | P(8) | P(3) | P(3) | P(3) | P(2) | P(5) | P(5) | P(7) | P(1) | P(4) |
| 011110 | P(5) | P(1) | P(4) | P(5) | P(7) | P(7) | P(4) | P(4) | P(4) | P(8) | P(1) | P(1) |
| 011111 | P(6) | P(5) | P(7) | P(6) | P(3) | P(6) | P(2) | P(2) | P(5) | P(5) | P(3) | P(4) |
| 100000 | P(6) | P(5) | P(4) | P(7) | P(6) | P(4) | P(6) | P(6) | P(8) | P(8) | P(1) | P(4) |
| 100001 | P(8) | P(8) | P(2) | P(2) | P(7) | P(3) | P(7) | P(5) | P(6) | P(8) | P(2) | P(2) |
| 100010 | P(4) | P(6) | P(6) | P(7) | P(2) | P(2) | P(8) | P(8) | P(8) | P(4) | P(5) | P(5) |
| 100011 | P(5) | P(8) | P(8) | P(7) | P(1) | P(7) | P(3) | P(6) | P(5) | P(3) | P(1) | P(6) |
| 100100 | P(2) | P(7) | P(4) | P(4) | P(1) | P(1) | P(2) | P(4) | P(8) | P(7) | P(7) | P(2) |
| 100101 | P(5) | P(5) | P(1) | P(3) | P(6) | P(7) | P(4) | P(5) | P(4) | P(1) | P(6) | P(5) |
| 100110 | P(8) | P(3) | P(5) | P(1) | P(7) | P(2) | P(5) | P(6) | P(2) | P(5) | P(8) | P(6) |
| 100111 | P(6) | P(2) | P(8) | P(7) | P(5) | P(8) | P(7) | P(1) | P(5) | P(2) | P(5) | P(2) |
| 101000 | P(8) | P(1) | P(5) | P(3) | P(4) | P(4) | P(8) | P(1) | P(4) | P(1) | P(8) | P(4) |
| 101001 | P(6) | P(4) | P(6) | P(4) | P(5) | P(3) | P(8) | P(4) | P(5) | P(6) | P(5) | P(7) |
| 101010 | P(7) | P(3) | P(7) | P(3) | P(4) | P(5) | P(5) | P(6) | P(5) | P(3) | P(2) | P(6) |
| 101011 | P(8) | P(5) | P(2) | P(8) | P(3) | P(5) | P(4) | P(2) | P(1) | P(4) | P(5) | P(6) |
| 101100 | P(3) | P(6) | P(3) | P(3) | P(2) | P(4) | P(7) | P(7) | P(3) | P(7) | P(3) | P(6) |
| 101101 | P(1) | P(3) | P(8) | P(8) | P(1) | P(2) | P(1) | P(8) | P(8) | P(8) | P(2) | P(5) |
| 101110 | P(4) | P(6) | P(3) | P(3) | P(6) | P(8) | P(2) | P(1) | P(8) | P(7) | P(4) | P(5) |
| 101111 | P(8) | P(6) | P(6) | P(1) | P(1) | P(6) | P(6) | P(7) | P(7) | P(7) | P(6) | P(2) |
| 110000 | P(7) | P(7) | P(4) | P(6) | P(2) | P(8) | P(7) | P(1) | P(3) | P(7) | P(4) | P(2) |

TABLE 1-continued

| 64 codewords | Tile0 | | Tile1 | | Tile2 | | Tile3 | | Tile4 | | Tile5 | |
|---|---|---|---|---|---|---|---|---|---|---|---|---|
| 110001 | P(1) | P(2) | P(2) | P(6) | P(3) | P(8) | P(4) | P(8) | P(3) | P(6) | P(2) | P(6) |
| 110010 | P(8) | P(8) | P(3) | P(4) | P(6) | P(2) | P(3) | P(7) | P(2) | P(3) | P(6) | P(8) |
| 110011 | P(4) | P(2) | P(8) | P(5) | P(6) | P(2) | P(3) | P(2) | P(1) | P(2) | P(8) | P(2) |
| 110100 | P(3) | P(2) | P(6) | P(1) | P(1) | P(2) | P(3) | P(7) | P(3) | P(7) | P(4) | P(1) |
| 110101 | P(1) | P(4) | P(6) | P(8) | P(5) | P(6) | P(8) | P(2) | P(7) | P(8) | P(7) | P(6) |
| 110110 | P(1) | P(7) | P(3) | P(6) | P(5) | P(6) | P(8) | P(2) | P(4) | P(3) | P(2) | P(8) |
| 110111 | P(1) | P(5) | P(5) | P(4) | P(4) | P(1) | P(7) | P(5) | P(1) | P(2) | P(2) | P(6) |
| 111000 | P(3) | P(8) | P(3) | P(7) | P(5) | P(3) | P(8) | P(1) | P(7) | P(6) | P(8) | P(3) |
| 111001 | P(3) | P(1) | P(6) | P(2) | P(5) | P(4) | P(3) | P(4) | P(1) | P(5) | P(5) | P(6) |
| 111010 | P(6) | P(8) | P(3) | P(8) | P(5) | P(8) | P(2) | P(4) | P(8) | P(2) | P(7) | P(3) |
| 111011 | P(5) | P(4) | P(4) | P(2) | P(2) | P(8) | P(4) | P(5) | P(6) | P(2) | P(4) | P(1) |
| 111100 | P(1) | P(1) | P(7) | P(5) | P(7) | P(6) | P(8) | P(6) | P(5) | P(7) | P(4) | P(5) |
| 111101 | P(6) | P(7) | P(3) | P(5) | P(1) | P(5) | P(1) | P(6) | P(3) | P(4) | P(7) | P(3) |
| 111110 | P(6) | P(7) | P(7) | P(3) | P(5) | P(6) | P(3) | P(6) | P(1) | P(6) | P(1) | P(3) |
| 111111 | P(6) | P(5) | P(2) | P(8) | P(8) | P(2) | P(2) | P(5) | P(2) | P(3) | P(2) | P(8) |

Referring to Table 1, P(*) denotes a phase of a codeword symbol on a constellation map, and is obtained according to Equation 1 below. One codeword symbol is an 8-phase shift keying (PSK) modulation symbol. Eight different codeword symbols can be obtained with 8-PSK.

Math Figure 1

$$P(k) = e^{\left(j\frac{\pi k}{4}\right)}, k = 1, 2, \ldots, 8 \quad \text{[Math. 1]}$$

A method for generating codewords will be described. Herein, tiles 0 to 5 express a codeword 000000 for example.

For the codeword 000000, the tile 0 transmits a 1st codeword symbol of P(8) and a 2nd codeword symbol of P(5). The tile 1 transmits a 1st codeword symbol of P(8) and a 2nd codeword symbol of P(1). The tile 2 transmits a 1st codeword symbol of P(7) and a 2nd codeword symbol of P(1). The tile 3 transmits a 1st codeword symbol of P(3) and a 2nd codeword symbol of P(3). The tile 4 transmits a 1st codeword symbol of P(7) and a 2nd codeword symbol of P(4). The tile 5 transmits a 1st codeword symbol of P(4) and a 2nd codeword symbol of P(3).

In this manner, all codewords are mapped to combinations of the tiles 0 to 5. Each tile transmits the 1st and 2nd codeword symbols. A combination of the 1st and 2nd codeword symbols transmitted by each tile may differ from one tile to another.

In the tile 0, four subcarriers transmit the 1st codeword of P(8), and the remaining four subcarriers transmit the 2nd codeword of P(5). In the tile 1, four subcarriers transmit the 1st codeword symbol of P(8), and the remaining four subcarriers transmit the 2nd codeword symbol of P(1). In the same manner, in the tile 5, four subcarriers transmit the 1st codeword symbol of P(4), and the remaining four subcarriers transmit the 2nd codeword symbol of P(3).

Accordingly, the 64 codewords 000000 to 111111 can be expressed with six tiles consisting of the 1st codeword symbol and the 2nd codeword symbol. Thus, 6-bit codewords can be generated on one subchannel.

Table 2 shows another example of a combination of 1st and 2nd codeword symbols of respective tiles corresponding to the 6-bit codewords.

TABLE 2

| 64 codewords | Tile0 | | Tile1 | | Tile2 | | Tile3 | | Tile4 | | Tile5 | |
|---|---|---|---|---|---|---|---|---|---|---|---|---|
| 000000 | P(1) | P(4) | P(2) | P(4) | P(2) | P(3) | P(2) | P(1) | P(3) | P(1) | P(4) | P(1) |
| 000001 | P(2) | P(3) | P(3) | P(1) | P(3) | P(3) | P(3) | P(4) | P(4) | P(3) | P(1) | P(1) |
| 000010 | P(3) | P(1) | P(4) | P(3) | P(1) | P(1) | P(2) | P(1) | P(4) | P(1) | P(1) | P(1) |
| 000011 | P(4) | P(2) | P(1) | P(2) | P(3) | P(2) | P(3) | P(2) | P(1) | P(1) | P(2) | P(3) |
| 000100 | P(3) | P(3) | P(1) | P(2) | P(3) | P(4) | P(4) | P(2) | P(2) | P(1) | P(3) | P(1) |
| 000101 | P(2) | P(2) | P(4) | P(2) | P(3) | P(2) | P(1) | P(2) | P(3) | P(4) | P(3) | P(2) |
| 000110 | P(4) | P(3) | P(2) | P(3) | P(4) | P(3) | P(2) | P(2) | P(3) | P(4) | P(1) | P(3) |
| 000111 | P(1) | P(2) | P(2) | P(3) | P(1) | P(3) | P(3) | P(3) | P(2) | P(2) | P(3) | P(2) |
| 001000 | P(4) | P(1) | P(1) | P(4) | P(3) | P(4) | P(2) | P(1) | P(2) | P(3) | P(4) | P(2) |
| 001001 | P(4) | P(4) | P(4) | P(2) | P(1) | P(1) | P(2) | P(3) | P(1) | P(4) | P(3) | P(1) |
| 001010 | P(1) | P(4) | P(1) | P(3) | P(3) | P(3) | P(4) | P(2) | P(4) | P(3) | P(1) | P(1) |
| 001011 | P(1) | P(1) | P(3) | P(3) | P(4) | P(2) | P(2) | P(4) | P(2) | P(2) | P(1) | P(1) |
| 001100 | P(2) | P(4) | P(3) | P(2) | P(4) | P(1) | P(2) | P(1) | P(3) | P(3) | P(4) | P(4) |
| 001101 | P(3) | P(2) | P(2) | P(4) | P(1) | P(3) | P(4) | P(2) | P(1) | P(2) | P(1) | P(4) |
| 001110 | P(2) | P(4) | P(4) | P(2) | P(1) | P(4) | P(4) | P(4) | P(3) | P(4) | P(3) | P(1) |
| 001111 | P(4) | P(2) | P(4) | P(4) | P(1) | P(3) | P(3) | P(3) | P(2) | P(4) | P(4) | P(4) |
| 010000 | P(3) | P(4) | P(2) | P(2) | P(1) | P(2) | P(1) | P(4) | P(4) | P(2) | P(2) | P(3) |
| 010001 | P(2) | P(1) | P(1) | P(4) | P(4) | P(2) | P(2) | P(2) | P(1) | P(4) | P(2) | P(1) |
| 010010 | P(2) | P(4) | P(3) | P(4) | P(3) | P(2) | P(4) | P(1) | P(1) | P(2) | P(3) | P(3) |
| 010011 | P(4) | P(3) | P(4) | P(1) | P(1) | P(2) | P(4) | P(2) | P(4) | P(3) | P(3) | P(3) |
| 010100 | P(2) | P(2) | P(1) | P(4) | P(2) | P(4) | P(2) | P(4) | P(1) | P(4) | P(1) | P(4) |
| 010101 | P(3) | P(3) | P(4) | P(1) | P(2) | P(4) | P(3) | P(4) | P(2) | P(1) | P(2) | P(3) |
| 010110 | P(1) | P(3) | P(4) | P(4) | P(1) | P(4) | P(3) | P(2) | P(1) | P(1) | P(1) | P(2) |
| 010111 | P(1) | P(1) | P(3) | P(1) | P(4) | P(1) | P(2) | P(4) | P(2) | P(2) | P(2) | P(1) |
| 011000 | P(1) | P(1) | P(4) | P(2) | P(4) | P(4) | P(1) | P(3) | P(2) | P(3) | P(4) | P(3) |

TABLE 2-continued

| 64 codewords | Tile0 | | Tile1 | | Tile2 | | Tile3 | | Tile4 | | Tile5 | |
|---|---|---|---|---|---|---|---|---|---|---|---|---|
| 011001 | P(4) | P(2) | P(2) | P(4) | P(2) | P(1) | P(4) | P(4) | P(1) | P(1) | P(4) | P(2) |
| 011010 | P(3) | P(3) | P(1) | P(3) | P(2) | P(2) | P(3) | P(4) | P(4) | P(4) | P(3) | P(4) |
| 011011 | P(3) | P(1) | P(3) | P(1) | P(2) | P(2) | P(1) | P(3) | P(1) | P(4) | P(1) | P(1) |
| 011100 | P(3) | P(2) | P(4) | P(3) | P(3) | P(4) | P(4) | P(3) | P(1) | P(3) | P(1) | P(2) |
| 011101 | P(2) | P(2) | P(2) | P(3) | P(4) | P(1) | P(1) | P(1) | P(1) | P(3) | P(4) | P(2) |
| 011110 | P(1) | P(3) | P(3) | P(1) | P(2) | P(1) | P(2) | P(1) | P(2) | P(4) | P(2) | P(1) |
| 011111 | P(3) | P(1) | P(2) | P(4) | P(3) | P(1) | P(3) | P(1) | P(3) | P(2) | P(2) | P(4) |
| 100000 | P(2) | P(3) | P(1) | P(1) | P(1) | P(1) | P(2) | P(3) | P(3) | P(2) | P(3) | P(2) |
| 100001 | P(1) | P(3) | P(1) | P(1) | P(3) | P(3) | P(1) | P(4) | P(2) | P(2) | P(2) | P(3) |
| 100010 | P(1) | P(2) | P(4) | P(4) | P(4) | P(1) | P(2) | P(4) | P(3) | P(1) | P(4) | P(3) |
| 100011 | P(1) | P(1) | P(1) | P(2) | P(1) | P(4) | P(3) | P(1) | P(4) | P(4) | P(3) | P(3) |
| 100100 | P(2) | P(1) | P(4) | P(3) | P(2) | P(3) | P(4) | P(1) | P(2) | P(1) | P(1) | P(4) |
| 100101 | P(1) | P(3) | P(2) | P(4) | P(3) | P(1) | P(2) | P(3) | P(1) | P(2) | P(1) | P(3) |
| 100110 | P(1) | P(4) | P(4) | P(3) | P(2) | P(1) | P(1) | P(2) | P(4) | P(1) | P(2) | P(2) |
| 100111 | P(4) | P(4) | P(3) | P(1) | P(3) | P(3) | P(4) | P(3) | P(2) | P(2) | P(1) | P(4) |
| 101000 | P(3) | P(1) | P(4) | P(1) | P(3) | P(3) | P(3) | P(1) | P(4) | P(1) | P(4) | P(2) |
| 101001 | P(1) | P(1) | P(2) | P(3) | P(3) | P(1) | P(1) | P(4) | P(2) | P(4) | P(2) | P(3) |
| 101010 | P(2) | P(3) | P(1) | P(2) | P(2) | P(1) | P(3) | P(2) | P(3) | P(1) | P(2) | P(4) |
| 101011 | P(4) | P(1) | P(3) | P(3) | P(2) | P(3) | P(3) | P(1) | P(3) | P(3) | P(2) | P(2) |
| 101100 | P(1) | P(3) | P(4) | P(4) | P(3) | P(2) | P(1) | P(3) | P(1) | P(1) | P(3) | P(1) |
| 101101 | P(2) | P(4) | P(1) | P(1) | P(2) | P(3) | P(3) | P(2) | P(1) | P(3) | P(3) | P(2) |
| 101110 | P(2) | P(4) | P(3) | P(2) | P(2) | P(4) | P(1) | P(2) | P(4) | P(4) | P(2) | P(4) |
| 101111 | P(4) | P(3) | P(4) | P(1) | P(4) | P(3) | P(1) | P(4) | P(2) | P(4) | P(1) | P(2) |
| 110000 | P(2) | P(4) | P(3) | P(3) | P(1) | P(2) | P(4) | P(2) | P(2) | P(3) | P(2) | P(1) |
| 110001 | P(4) | P(3) | P(3) | P(4) | P(2) | P(4) | P(1) | P(3) | P(3) | P(4) | P(3) | P(2) |
| 110010 | P(4) | P(1) | P(4) | P(1) | P(1) | P(4) | P(1) | P(4) | P(3) | P(2) | P(1) | P(4) |
| 110011 | P(3) | P(4) | P(1) | P(2) | P(4) | P(3) | P(2) | P(4) | P(1) | P(2) | P(4) | P(1) |
| 110100 | P(2) | P(1) | P(2) | P(2) | P(4) | P(3) | P(3) | P(2) | P(3) | P(1) | P(1) | P(1) |
| 110101 | P(4) | P(2) | P(3) | P(2) | P(4) | P(4) | P(1) | P(4) | P(4) | P(1) | P(3) | P(4) |
| 110110 | P(1) | P(2) | P(3) | P(2) | P(1) | P(3) | P(4) | P(1) | P(1) | P(4) | P(4) | P(3) |
| 110111 | P(3) | P(4) | P(1) | P(1) | P(4) | P(1) | P(4) | P(2) | P(3) | P(4) | P(1) | P(2) |
| 111000 | P(2) | P(3) | P(2) | P(2) | P(3) | P(4) | P(4) | P(4) | P(3) | P(2) | P(4) | P(3) |
| 111001 | P(4) | P(3) | P(1) | P(1) | P(3) | P(1) | P(1) | P(4) | P(4) | P(3) | P(4) | P(1) |
| 111010 | P(3) | P(1) | P(2) | P(3) | P(3) | P(3) | P(1) | P(1) | P(4) | P(4) | P(4) | P(4) |
| 111011 | P(2) | P(1) | P(1) | P(1) | P(1) | P(2) | P(1) | P(2) | P(1) | P(2) | P(3) | P(3) |
| 111100 | P(3) | P(4) | P(4) | P(4) | P(1) | P(2) | P(2) | P(1) | P(2) | P(3) | P(1) | P(3) |
| 111101 | P(2) | P(1) | P(2) | P(1) | P(1) | P(4) | P(3) | P(4) | P(1) | P(2) | P(1) | P(2) |
| 111110 | P(1) | P(1) | P(2) | P(3) | P(1) | P(2) | P(4) | P(3) | P(4) | P(1) | P(4) | P(4) |
| 111111 | P(1) | P(1) | P(1) | P(1) | P(3) | P(1) | P(3) | P(3) | P(2) | P(1) | P(4) | P(1) |

Referring to Table 2, P(*) is obtained according to Equation 2 below. One codeword symbol is a quadrature phase shift keying (QPSK) modulation symbol. Four different codeword symbols can be obtained with QPSK.

Math Figure 2

$$P(k) = e^{\left(j\frac{\pi(2k-1)}{4}\right)}, k = 1, 2, 3, 4 \qquad [\text{Math. 2}]$$

The way of generating the codewords of Table 2 is the same as that of Table 1. Only difference between the two tables is that four different symbols can be obtained in the method of generating the codewords of Table 2 since QPSK is used.

A receiver receives the codewords of Table 1 or Table 2. To detect a type of codeword of the received signal, a maximum likelihood (ML) scheme is used. In the ML scheme, all combinations of symbols corresponding to the 64 codewords are compared with the received signal in a process of detecting the received signal, and a codeword is selected so that the selected codeword provides a value which is most optimal to a specific criterion.

Since all codewords are compared with the received signal, a large computational amount is required in the ML scheme. To reduce the computational amount, 64 codewords can be generated as follows.

The 64 codewords are classified into four groups. Codewords 0 to 15 (i.e., 000000 to 001111) belong to a 1st group. Codewords 16 to 31 (i.e., 010000 to 011111) belong to a 2nd group. Codewords 32 to 47 (i.e., 100000 to 101111) belong to a 3rd group. Codewords 48 to 63 (i.e., 110000 to 111111) belong to a 4th group. Codewords in each group use modulations with a specific phase pattern.

For further detailed explanation, it is assumed that the codewords 0 to 15 in the 1st group respectively use modulations $w_0$ to $w_{15}$, the codewords 16 to 31 in the 2nd group respectively use modulations $w_{16}$ to $w_{31}$, the codewords 32 to 47 in the 3rd group respectively use $w_{32}$ to $w_{47}$, and the codewords 48 to 63 in the 4th group respectively use modulations $w_{48}$ to $w_{63}$. The modulations of the respective groups are related by Equation 3 below.

MathFigure 3

$$[w16 \sim w31] = -[w0 \sim w15]$$

$$[w32 \sim w47] = j[w0 \sim w15]$$

$$[w48 \sim w63] = -j[w0 \sim w15] \qquad [\text{Math.3}]$$

The modulations for the codewords in the 2nd to 4th groups can be expressed by the modulations for the codewords in the 1st group. That is, $w_{i+16} = -w_i$, $w_{i+32} = jw_i$, $w_{i+48} = -jw_i$ (i=0, 1, 2, ..., 15). Therefore, $w_{16} = -w_0$, $w_{17} = -w_1$, ..., $w_{31} = -w_{15}$, $w_{32} = jw_0$, $w_{33} = jw_1$, $w_{47} = jw_{15}$, $w_{48} = -jw_0$, $w_{49} = -jw_1$, ..., $w_{62} = -jw_{14}$, $w_{63} = -jw_{15}$.

Table 3 shows an example of a method for generating 64 codewords by classifying the 64 codewords into four groups according to modulations.

TABLE 3

| 64 codewords | Tile0 | | Tile1 | | Tile2 | | Tile3 | | Tile4 | | Tile5 | |
|---|---|---|---|---|---|---|---|---|---|---|---|---|
| 000000 | P(4) | P(1) | P(2) | P(4) | P(4) | P(1) | P(2) | P(1) | P(3) | P(1) | P(2) | P(4) |
| 000001 | P(3) | P(2) | P(2) | P(3) | P(2) | P(2) | P(1) | P(4) | P(3) | P(3) | P(3) | P(2) |
| 000010 | P(3) | P(2) | P(3) | P(4) | P(1) | P(4) | P(4) | P(1) | P(4) | P(4) | P(3) | P(1) |
| 000011 | P(3) | P(4) | P(1) | P(1) | P(2) | P(2) | P(4) | P(1) | P(4) | P(3) | P(3) | P(1) |
| 000100 | P(2) | P(1) | P(4) | P(3) | P(3) | P(1) | P(2) | P(2) | P(3) | P(2) | P(3) | P(2) |
| 000101 | P(3) | P(4) | P(4) | P(1) | P(1) | P(1) | P(1) | P(4) | P(2) | P(4) | P(3) | P(4) |
| 000110 | P(4) | P(4) | P(3) | P(1) | P(4) | P(3) | P(3) | P(2) | P(2) | P(3) | P(2) | P(2) |
| 000111 | P(2) | P(4) | P(3) | P(4) | P(4) | P(2) | P(1) | P(3) | P(3) | P(1) | P(4) | P(2) |
| 001000 | P(2) | P(3) | P(2) | P(1) | P(3) | P(3) | P(2) | P(2) | P(3) | P(4) | P(2) | P(4) |
| 001001 | P(2) | P(1) | P(1) | P(1) | P(3) | P(3) | P(4) | P(3) | P(2) | P(4) | P(4) | P(1) |
| 001010 | P(1) | P(2) | P(3) | P(2) | P(1) | P(1) | P(1) | P(3) | P(1) | P(3) | P(4) | P(4) |
| 001011 | P(4) | P(3) | P(4) | P(2) | P(4) | P(2) | P(1) | P(2) | P(3) | P(4) | P(4) | P(4) |
| 001100 | P(1) | P(2) | P(4) | P(4) | P(4) | P(3) | P(4) | P(1) | P(2) | P(1) | P(4) | P(2) |
| 001101 | P(4) | P(3) | P(4) | P(1) | P(3) | P(4) | P(1) | P(4) | P(4) | P(3) | P(2) | P(2) |
| 001110 | P(3) | P(4) | P(4) | P(3) | P(4) | P(3) | P(3) | P(1) | P(1) | P(3) | P(4) | P(4) |
| 001111 | P(3) | P(3) | P(1) | P(2) | P(1) | P(3) | P(2) | P(2) | P(1) | P(4) | P(2) | P(2) |
| 010000 | P(2) | P(3) | P(4) | P(2) | P(2) | P(3) | P(4) | P(3) | P(1) | P(3) | P(4) | P(2) |
| 010001 | P(1) | P(4) | P(4) | P(1) | P(4) | P(4) | P(3) | P(2) | P(1) | P(1) | P(1) | P(3) |
| 010010 | P(1) | P(4) | P(1) | P(2) | P(3) | P(2) | P(2) | P(3) | P(2) | P(2) | P(1) | P(3) |
| 010011 | P(1) | P(2) | P(3) | P(3) | P(4) | P(4) | P(2) | P(3) | P(2) | P(1) | P(1) | P(3) |
| 010100 | P(4) | P(3) | P(2) | P(1) | P(1) | P(3) | P(4) | P(4) | P(1) | P(4) | P(1) | P(4) |
| 010101 | P(1) | P(2) | P(2) | P(3) | P(4) | P(3) | P(3) | P(2) | P(4) | P(2) | P(1) | P(2) |
| 010110 | P(2) | P(2) | P(1) | P(3) | P(2) | P(1) | P(1) | P(4) | P(4) | P(1) | P(4) | P(4) |
| 010111 | P(4) | P(2) | P(1) | P(2) | P(2) | P(4) | P(3) | P(1) | P(1) | P(3) | P(2) | P(4) |
| 011000 | P(4) | P(1) | P(4) | P(3) | P(1) | P(1) | P(4) | P(4) | P(1) | P(2) | P(4) | P(2) |
| 011001 | P(4) | P(3) | P(3) | P(3) | P(1) | P(1) | P(2) | P(1) | P(1) | P(1) | P(2) | P(3) |
| 011010 | P(3) | P(4) | P(1) | P(4) | P(3) | P(3) | P(3) | P(1) | P(3) | P(1) | P(2) | P(2) |
| 011011 | P(2) | P(1) | P(2) | P(4) | P(2) | P(4) | P(3) | P(4) | P(1) | P(2) | P(2) | P(2) |
| 011100 | P(3) | P(4) | P(2) | P(2) | P(2) | P(1) | P(2) | P(3) | P(4) | P(3) | P(2) | P(4) |
| 011101 | P(2) | P(1) | P(4) | P(1) | P(3) | P(1) | P(2) | P(3) | P(2) | P(1) | P(4) | P(4) |
| 011110 | P(1) | P(2) | P(4) | P(1) | P(2) | P(1) | P(1) | P(3) | P(3) | P(1) | P(2) | P(2) |
| 011111 | P(1) | P(1) | P(3) | P(4) | P(3) | P(1) | P(4) | P(4) | P(3) | P(2) | P(4) | P(4) |
| 100000 | P(1) | P(2) | P(3) | P(1) | P(1) | P(2) | P(3) | P(2) | P(4) | P(2) | P(3) | P(1) |
| 100001 | P(4) | P(3) | P(3) | P(4) | P(3) | P(3) | P(2) | P(1) | P(4) | P(4) | P(4) | P(3) |
| 100010 | P(4) | P(3) | P(4) | P(1) | P(2) | P(1) | P(1) | P(2) | P(1) | P(1) | P(1) | P(2) |
| 100011 | P(4) | P(1) | P(2) | P(2) | P(3) | P(3) | P(1) | P(2) | P(1) | P(4) | P(4) | P(2) |
| 100100 | P(3) | P(2) | P(1) | P(4) | P(4) | P(2) | P(3) | P(3) | P(4) | P(3) | P(4) | P(3) |
| 100101 | P(4) | P(1) | P(1) | P(2) | P(2) | P(2) | P(2) | P(1) | P(3) | P(1) | P(4) | P(1) |
| 100110 | P(1) | P(1) | P(4) | P(2) | P(1) | P(4) | P(4) | P(3) | P(3) | P(4) | P(3) | P(3) |
| 100111 | P(3) | P(1) | P(4) | P(1) | P(1) | P(3) | P(2) | P(3) | P(4) | P(2) | P(1) | P(3) |
| 101000 | P(3) | P(4) | P(3) | P(2) | P(4) | P(4) | P(3) | P(3) | P(4) | P(1) | P(3) | P(1) |
| 101001 | P(3) | P(2) | P(2) | P(2) | P(4) | P(4) | P(1) | P(4) | P(4) | P(1) | P(1) | P(2) |
| 101010 | P(2) | P(3) | P(4) | P(3) | P(2) | P(2) | P(2) | P(4) | P(2) | P(4) | P(1) | P(1) |
| 101011 | P(1) | P(4) | P(1) | P(3) | P(1) | P(3) | P(2) | P(3) | P(4) | P(1) | P(1) | P(1) |
| 101100 | P(2) | P(3) | P(1) | P(1) | P(1) | P(4) | P(1) | P(2) | P(3) | P(2) | P(1) | P(3) |
| 101101 | P(1) | P(4) | P(1) | P(2) | P(4) | P(1) | P(2) | P(1) | P(1) | P(3) | P(3) | P(3) |
| 101110 | P(4) | P(1) | P(1) | P(4) | P(1) | P(4) | P(4) | P(2) | P(2) | P(4) | P(1) | P(1) |
| 101111 | P(4) | P(4) | P(2) | P(3) | P(2) | P(4) | P(3) | P(3) | P(2) | P(1) | P(3) | P(3) |
| 110000 | P(3) | P(4) | P(1) | P(3) | P(3) | P(4) | P(1) | P(4) | P(2) | P(4) | P(1) | P(3) |
| 110001 | P(2) | P(1) | P(1) | P(2) | P(1) | P(1) | P(4) | P(3) | P(2) | P(2) | P(2) | P(1) |
| 110010 | P(2) | P(1) | P(2) | P(3) | P(4) | P(3) | P(1) | P(3) | P(3) | P(2) | P(2) | P(4) |
| 110011 | P(2) | P(3) | P(4) | P(4) | P(1) | P(1) | P(3) | P(4) | P(3) | P(2) | P(2) | P(4) |
| 110100 | P(1) | P(4) | P(3) | P(2) | P(2) | P(4) | P(1) | P(1) | P(2) | P(1) | P(2) | P(1) |
| 110101 | P(2) | P(3) | P(3) | P(4) | P(4) | P(4) | P(4) | P(3) | P(1) | P(3) | P(2) | P(3) |
| 110110 | P(3) | P(3) | P(2) | P(4) | P(3) | P(2) | P(2) | P(1) | P(1) | P(2) | P(1) | P(1) |
| 110111 | P(1) | P(3) | P(2) | P(3) | P(3) | P(1) | P(4) | P(1) | P(2) | P(4) | P(3) | P(1) |
| 111000 | P(1) | P(2) | P(1) | P(4) | P(2) | P(2) | P(1) | P(1) | P(2) | P(3) | P(1) | P(3) |
| 111001 | P(1) | P(4) | P(4) | P(4) | P(2) | P(2) | P(3) | P(2) | P(2) | P(3) | P(3) | P(4) |
| 111010 | P(4) | P(1) | P(2) | P(1) | P(4) | P(4) | P(4) | P(2) | P(4) | P(2) | P(3) | P(3) |
| 111011 | P(3) | P(2) | P(3) | P(1) | P(3) | P(1) | P(4) | P(1) | P(2) | P(3) | P(3) | P(3) |
| 111100 | P(4) | P(1) | P(3) | P(3) | P(3) | P(2) | P(3) | P(4) | P(1) | P(4) | P(3) | P(1) |
| 111101 | P(3) | P(2) | P(3) | P(4) | P(3) | P(4) | P(3) | P(3) | P(2) | P(1) | P(1) | P(1) |
| 111110 | P(2) | P(3) | P(3) | P(2) | P(3) | P(2) | P(2) | P(4) | P(4) | P(2) | P(3) | P(3) |
| 111111 | P(2) | P(2) | P(4) | P(1) | P(4) | P(2) | P(1) | P(1) | P(4) | P(3) | P(1) | P(1) |

Referring to Table 3, P(*) is obtained in the same manner as Equation 2 described with Table 2 above. One codeword symbol is a QPSK modulation symbol. Four different codeword symbols can be obtained with QPSK.

When the codeword 000000($w_0$) is compared with the codeword 010000($w_{16}$), P(4) is a 1st codeword symbol of the tile 0 corresponding to the codeword 000000, and P(2) is a 1st codeword symbol of the tile 0 corresponding to the codeword 010000. Thus, P(2)=−P(4). Likewise, P(1) is a 2nd codeword symbol of the tile 0 corresponding to the codeword 000000, and P(3) is a 1st codeword symbol of the tile 0 corresponding to the codeword 010000. Thus, P(3)=−P(1).

Table 4 shows another example of a method for generating 64 codewords by classifying the codewords into 4 groups according to modulations.

TABLE 4

| 16 Codewords | Tile0 | | | | Tile1 | | | | Tile2 | | | | Tile3 | | | | Tile4 | | | | Tile5 | | | |
|---|---|---|---|---|---|---|---|---|---|---|---|---|---|---|---|---|---|---|---|---|---|---|---|---|
| 000000 | P(1) | P(3) | P(5) | P(1) | P(1) | P(3) | P(5) | P(3) | P(7) | P(3) | P(5) | P(1) | | | | | | | | | | | | |
| 000001 | P(7) | P(5) | P(5) | P(7) | P(5) | P(5) | P(3) | P(1) | P(7) | P(7) | P(7) | P(5) | | | | | | | | | | | | |
| 000010 | P(7) | P(5) | P(7) | P(1) | P(3) | P(1) | P(1) | P(3) | P(1) | P(1) | P(7) | P(3) | | | | | | | | | | | | |
| 000011 | P(7) | P(1) | P(3) | P(3) | P(5) | P(5) | P(1) | P(3) | P(1) | P(7) | P(7) | P(3) | | | | | | | | | | | | |
| 000100 | P(5) | P(3) | P(1) | P(7) | P(7) | P(3) | P(5) | P(5) | P(7) | P(5) | P(7) | P(5) | | | | | | | | | | | | |
| 000101 | P(7) | P(1) | P(1) | P(3) | P(3) | P(3) | P(3) | P(1) | P(5) | P(1) | P(7) | P(1) | | | | | | | | | | | | |
| 000110 | P(1) | P(1) | P(7) | P(3) | P(1) | P(7) | P(7) | P(5) | P(5) | P(7) | P(5) | P(5) | | | | | | | | | | | | |
| 000111 | P(5) | P(1) | P(7) | P(1) | P(1) | P(5) | P(3) | P(7) | P(7) | P(3) | P(1) | P(5) | | | | | | | | | | | | |
| 001000 | P(5) | P(7) | P(5) | P(3) | P(7) | P(7) | P(5) | P(5) | P(7) | P(1) | P(5) | P(1) | | | | | | | | | | | | |
| 001001 | P(5) | P(3) | P(3) | P(3) | P(7) | P(7) | P(1) | P(7) | P(7) | P(1) | P(1) | P(3) | | | | | | | | | | | | |
| 001010 | P(3) | P(5) | P(7) | P(5) | P(3) | P(3) | P(3) | P(7) | P(3) | P(7) | P(1) | P(1) | | | | | | | | | | | | |
| 001011 | P(1) | P(7) | P(1) | P(5) | P(1) | P(5) | P(3) | P(5) | P(7) | P(1) | P(1) | P(1) | | | | | | | | | | | | |
| 001100 | P(3) | P(5) | P(1) | P(1) | P(1) | P(7) | P(1) | P(3) | P(5) | P(3) | P(1) | P(5) | | | | | | | | | | | | |
| 001101 | P(1) | P(7) | P(1) | P(3) | P(7) | P(1) | P(3) | P(1) | P(1) | P(7) | P(5) | P(5) | | | | | | | | | | | | |
| 001110 | P(7) | P(1) | P(1) | P(7) | P(1) | P(7) | P(7) | P(3) | P(3) | P(7) | P(1) | P(1) | | | | | | | | | | | | |
| 001111 | P(7) | P(7) | P(3) | P(5) | P(3) | P(7) | P(5) | P(5) | P(3) | P(1) | P(5) | P(5) | | | | | | | | | | | | |

Referring to Table 4, codewords 0 to 15 in the 1st group are represented. The codewords in the 2nd to 4th groups (not shown in table 4) can be obtained using the codewords in the 1st group. It is assumed that the codewords 000000 to 001111 respectively use the modulations $w_0$ to $w_{15}$, the codewords 16 to 31 the 2nd group respectively use the modulations $w_{16}$ to $w_{31}$, the codewords 32 to 47 in the 3rd group respectively use the modulations $w_{32}$ to $w_{47}$, and the codewords 48 to 63 in the 4th group respectively use the modulations $w_{48}$ to $w_{63}$. The modulations of the respective groups are related by Equation 3 above.

The modulations for the codewords in the 2nd to 4th groups can be expressed with the modulations for the codewords in the 1st group. That is, $w_{i+16}=-w_i$, $w_{i+32}=jw_i$, $w_{i+48}=-jw_i$ (i=0, 1, 2, ..., 15). Therefore, $w_{16}=-w_0$, $w_{17}=-w_1$, ..., $w_{31}=-w_{15}$, $w_{32}=jw_0$, $w_{33}=jw_1$, ..., $w_{47}=jw_{15}$, $w_{48}=-jw_0$, $w_{49}=-jw_1$, ..., $w_{62}=-jw_{14}$, $w_{63}=-jw_{15}$.

By defining a mapping rule between groups, when the receiver detects the received signal according to the ML scheme, only a codeword in one specific group can be detected using the ML scheme and other codewords in the remaining groups can be detected by calculating magnitudes of a real value, a negative real value, an imaginary value, and a negative imaginary value of a detection result on the one specific group.

Since the receiver does not have to detect the received signal according to the ML scheme for all codewords, a computational amount required to detect the received signal can be reduced.

<Method for Multiplexing Codeword for Plurality of UEs>

Hereinafter, a method for multiplexing 6-bit codewords with respect to 4 UEs will be described.

As described above, one codeword is represented with six tiles. Each tile includes eight data subcarriers, wherein four data subcarriers transmit a 1st codeword symbol and the remaining four data subcarriers transmit a 2nd codeword symbol. When a codeword symbol is allocated to the four data subcarriers, a phase of each data subcarrier is modulated and spread using one of predetermined orthogonal codes. Therefore, the codewords can be multiplexed. Multiplexing of the codewords in this manner is called discrete Fourier transform (DFT) spreading.

When data subcarriers are spread using an orthogonal code consisting of four elements, four data subcarriers can be obtained. For example, even when four data subcarriers obtained using a 1st orthogonal code and four data subcarriers obtained using a 2nd orthogonal code transmit the same codeword symbol, a summation result is 0. An orthogonal code matrix C is expressed by Equation 4 below. Each column is an orthogonal code consisting of four elements. For example, a 1st column consists of elements of (1, 1, 1, 1).

Figure 4:
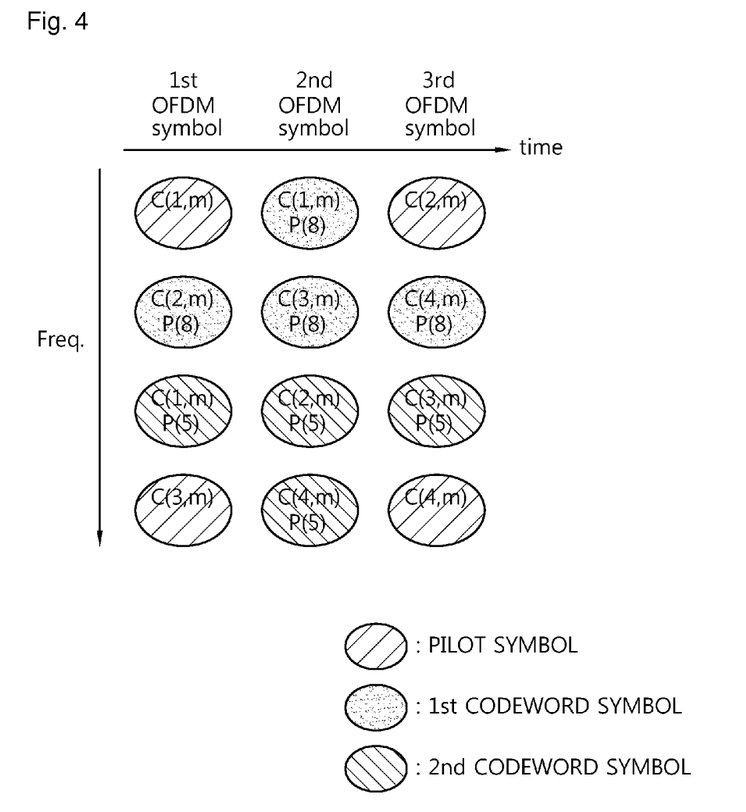
FIG. 4 shows a method for allocating a codeword symbol and a pilot symbol to subcarriers of a tile according to an embodiment of the present invention.

Math Figure 4

$$C = \begin{bmatrix} 1 & 1 & 1 & 1 \\ 1 & j & -1 & -j \\ 1 & -1 & 1 & -1 \\ 1 & -j & -1 & j \end{bmatrix}$$ [Math. 4]

It is assumed that, for the codeword 000000 of Table 1 above, a first UE (i.e., UE1) uses a 1st column of the matrix C and a second UE (i.e., UE2) uses a 2nd column of the matrix C to perform DFT spreading. The 1st and 2nd codeword symbols of the tile 0 mapped to the codeword 000000 are respectively P(8) and P(5).

In the UE1, the 1st codeword symbols transmitted by four data subcarriers of the tile 0 are respectively P(8), P(8), P(8), and P(8). The 2nd codeword symbols transmitted by the remaining four data subcarriers are respectively P(5), P(5), P(5), and P(5). The 1st and 2nd codeword symbols transmitted by a plurality of subcarriers of a tile n ($0 \leq n \leq 5$) can be obtained in the same manner.

In the UE2, the 1st codeword symbols transmitted by four data subcarriers of the tile 0 are respectively P(8), jP(8), −P(8), and −jP(8). The 2nd codeword symbols transmitted by the remaining four data subcarriers are respectively P(5), jP(5), −P(5), and −jP(5).

When the UE1 and the UE2 simultaneously transmit the codeword 000000, codeword symbols transmitted by the UE1 are added to the codeword symbols transmitted by the UE2. Since a summation result is 0, orthogonality is maintained. As such, by using the matrix C, the same codeword can be multiplexed and transmitted for four UEs on the same subchannel. Of course, the same DFT spreading can be performed on a pilot included in each tile with respect to each UE.

The matrix C is for exemplary purposes only. Thus, the matrix for codeword multiplexing may have various sizes in addition to 4×4 according to the number of data subcarriers included in the tile. Of course, any matrix capable of maintaining orthogonality can be used.

In order for a BS to perform decoding by receiving multiplexed data from each UE, each UE has to first know information regarding which column of the matrix C is used to perform DFT spreading. This information will be hereinafter referred to as orthogonal code information. The orthogonal code information may be predetermined by the BS and is reported to the UE by the BS. Alternatively, a method for determining the orthogonal code information may be predetermined between the BS and the UE, and data decoding can be directly performed using only parameter values without additionally reporting the orthogonal code information.

A DFT channel estimation method may be used in the data decoding. In this method, channel values of a pilot are separated for channel estimation, wherein signals of a plurality of UEs are mixed in the pilot. Since a pilot of each UE is transmitted as a DFT-spread signal by a specific column of the matrix C, the BS can estimate a channel of each UE by perform inverse DFT (IDFT) on a result obtained by summing all received signals. Accordingly, a channel estimation value is obtained. Channel compensation is performed on the channel estimation value. Thereafter, an ML receiver may be used to restore data.

<Method for Allocating Codeword Symbol and Pilot Symbol to Subcarrier of Tile>

In a method to be described hereinafter, a specific UE performs DFT spreading by using an mth column of an orthogonal code matrix C and then assigns a codeword symbol or a pilot symbol on subcarriers of each tile. C(k,m) denotes a kth codeword symbol or a pilot symbol obtained through DFT spreading by using the mth column of the orthogonal code matrix C.

FIG. 4 shows a method for allocating a codeword symbol and a pilot symbol to subcarriers of a tile according to an embodiment of the present invention. A time axis represents an OFDM symbol unit. A frequency axis represents a subcarrier unit. The tile has a structure of 4×3 (i.e., the number of subcarriers×the number of OFDM symbols).

Referring to FIG. 4, through DFT spreading, four pilot symbols C(1,m), C(2,m), C(3,m), and C(4,m) are assigned to pilot subcarriers located at corners of the tile. A 1st codeword symbol P(8) is DFT-spread by using the mth column of the matrix C, thereby generating four 1st codeword symbols. The generated 1st codeword symbols are locally assigned to data subcarriers located in the upper portion of the tile.

Through the DFT spreading, four 2nd codeword symbols P(5) are generated. The generated 2nd codeword symbols are locally assigned to data subcarriers located in the lower portion of the tile. In such a manner, 1st and 2nd data symbols are respectively assigned to half of data subcarriers within one tile, and then are transmitted.

Figure 5:
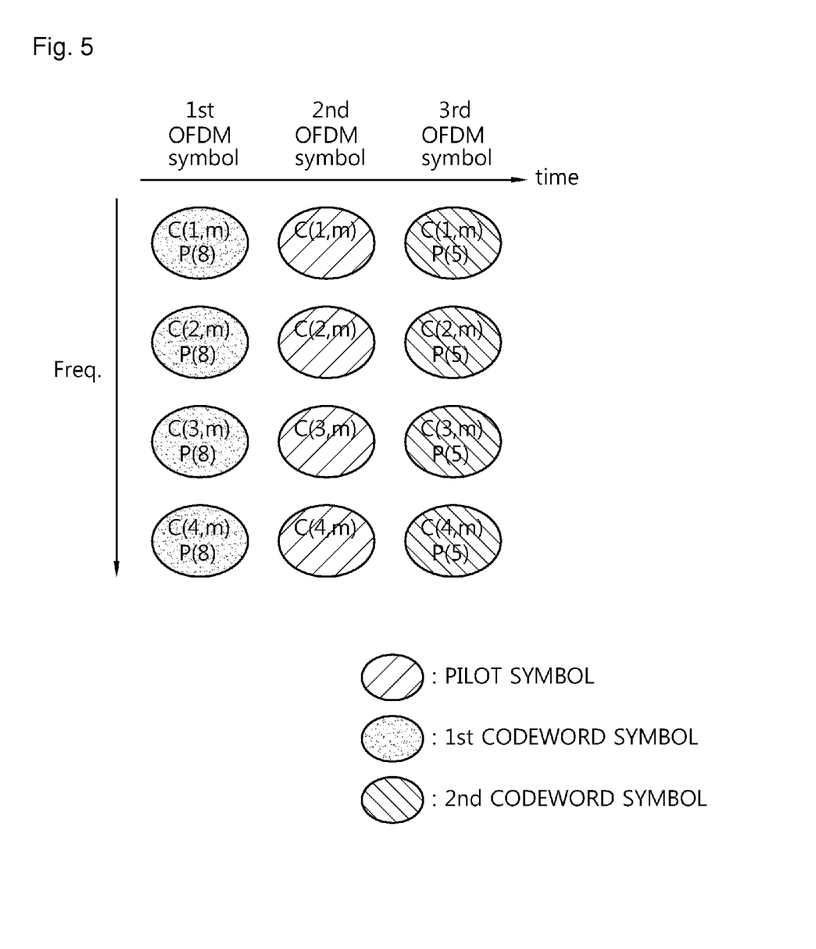
FIG. 5 shows a method for allocating a codeword symbol and a pilot symbol to subcarriers of a tile according to another embodiment of the present invention.

FIG. 5 shows a method for allocating a codeword symbol and a pilot symbol to subcarriers of a tile according to another embodiment of the present invention. A time axis represents an OFDM symbol unit. A frequency axis represents a subcarrier unit. The tile has a structure of 4×3 (i.e., the number of subcarriers×the number of OFDM symbols).

Referring to FIG. 5, pilot symbols, 1st codeword symbols P(8), and 2nd codeword symbols P(5) are DFT-spread by using the mth column of the matrix C. All of the 1st codeword symbols are assigned to four subcarriers in a 1st OFDM symbol. All of the pilot symbols are assigned to four subcarriers in a 2nd OFDM symbol. All of the 2nd codeword symbols are assigned to four subcarriers on a 3rd OFDM symbol.

Figure 6:
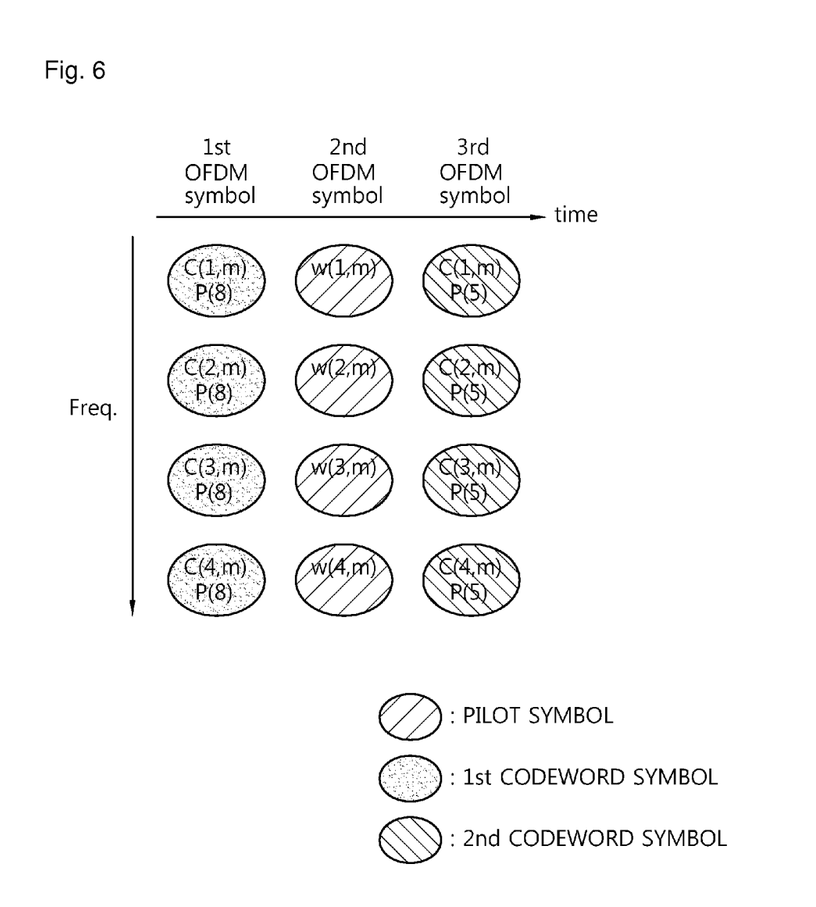
FIG. 6 shows a method for allocating a codeword symbol and a pilot symbol to subcarriers of a tile according to another embodiment of the present invention.

FIG. 6 shows a method for allocating a codeword symbol and a pilot symbol to subcarriers of a tile according to another embodiment of the present invention. The tile structure of FIG. 6 is suitable for a case where SC-FDMA is used as a multiple access scheme in uplink. A time axis represents an OFDM symbol unit. A frequency axis represents a subcarrier unit. The tile has a structure of 4×3 (i.e., the number of subcarriers×the number of OFDM symbols).

Referring to FIG. 6, pilot symbols, 1st codeword symbols P(8), and 2nd codeword symbols P(5) are DFT-spread by using the mth column of the matrix C. Four 1st codeword symbols C(1,m); P(8) to C(4,m); P(8) are assigned to four subcarriers in a 1st OFDM symbol. Four pilot symbols w (1,m) to w (4,m) are assigned to four subcarriers in a 2nd OFDM symbol. Four 2nd codeword symbols C(1,m); P(5) to C(4,m); P(5) are assigned to four subcarriers on a 3rd OFDM symbol. Herein, w denotes a pilot sequence for channel estimation. A pilot signal can be multiplexed using a constant amplitude zero auto-correlation (CAZAC) sequence.

Figure 7:
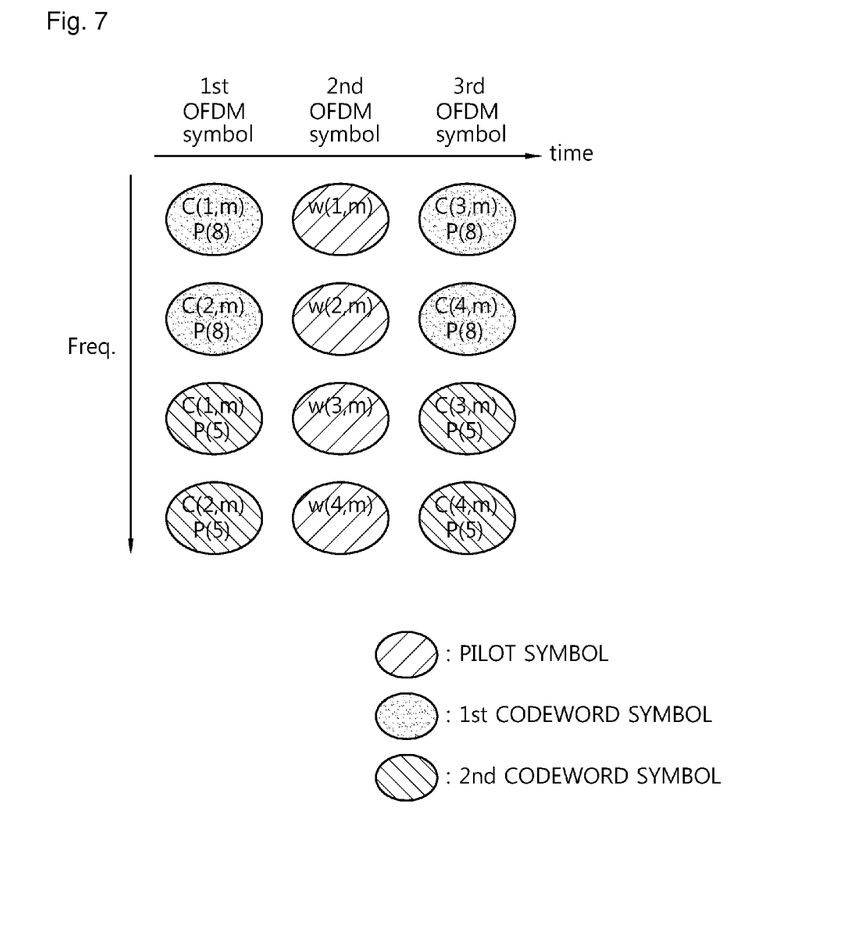
FIG. 7 shows a method for allocating a codeword symbol and a pilot symbol to subcarriers of a tile according to another embodiment of the present invention.

FIG. 7 shows a method for allocating a codeword symbol and a pilot symbol to subcarriers of a tile according to another embodiment of the present invention. The tile structure of FIG. 7 is suitable for a case where SC-FDMA is used as a multiple access scheme in uplink. A time axis represents an OFDM symbol unit. A frequency axis represents a subcarrier unit. The tile has a structure of 4×3 (i.e., the number of subcarriers×the number of OFDM symbols).

Referring to FIG. 7, pilot symbols, 1st codeword symbols P(8), and 2nd codeword symbols P(5) are DFT-spread by using the mth column of the matrix C. In a 1st OFDM symbol, two contiguous subcarriers located in the upper portion transmit two 1st codeword symbols C(1,m); P(8) and C(2,m); P(8), and two contiguous subcarriers located in the lower portion transmit two 2nd codeword symbols C(1,m); P(5) and C(2, m); P(5). In a 2nd OFDM symbol, four pilot symbols w (1,m) to w (4,m) are assigned to four subcarriers. In a 3rd OFDM symbol, two contiguous subcarriers located in the upper portion transmit two 1st codeword symbols C(3,m); P(8) to C(4, m); P(8), and two contiguous subcarriers located in the lower portion transmit two 2nd codeword symbols C(3,m); P(5) to C(4,m); P(5).

Figure 8:
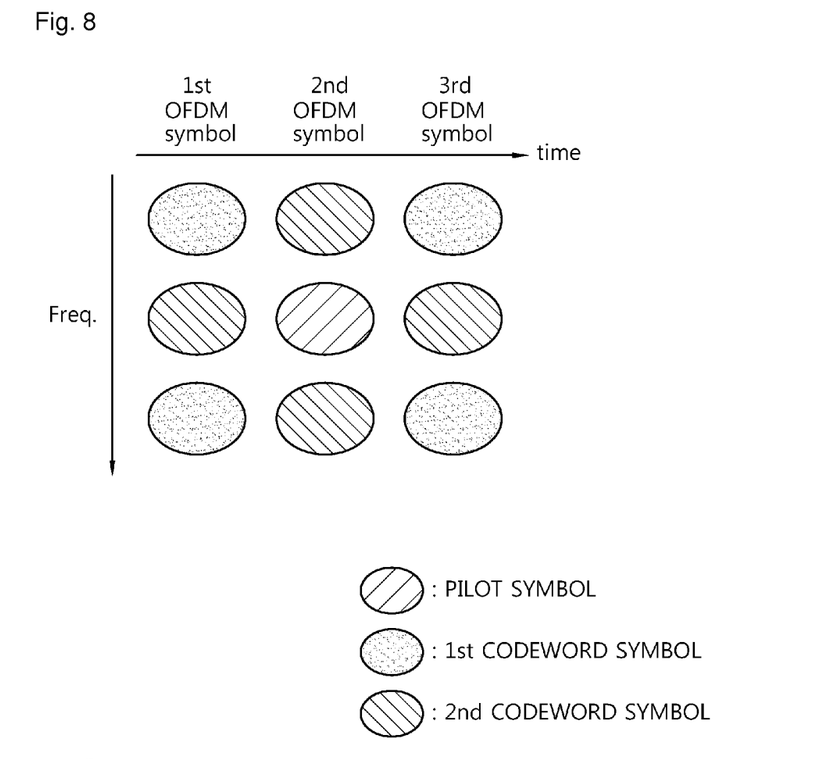
FIG. 8 shows a method for allocating a codeword symbol and a pilot symbol to subcarriers of a tile according to another embodiment of the present invention.

FIG. 8 shows a method for allocating a codeword symbol and a pilot symbol to subcarriers of a tile according to another embodiment of the present invention. A time axis represents an OFDM symbol unit. A frequency axis represents a subcarrier unit. The tile has a structure of 3×3 (i.e., the number of subcarriers×the number of OFDM symbols).

Referring to FIG. 8, unlike the tile structures of FIGS. 4 to 7, the tile of FIG. 8 has a structure in which one pilot subcarrier is located in the core of the tile and the pilot subcarrier is surrounded by the remaining eight data subcarriers. Among the eight data subcarriers, 1st data symbols are assigned to four data subcarriers corresponding to vertexes, and 2nd data symbols are assigned to the remaining four subcarriers other than the data subcarriers assigned with the 1st data symbols.

Figure 9:
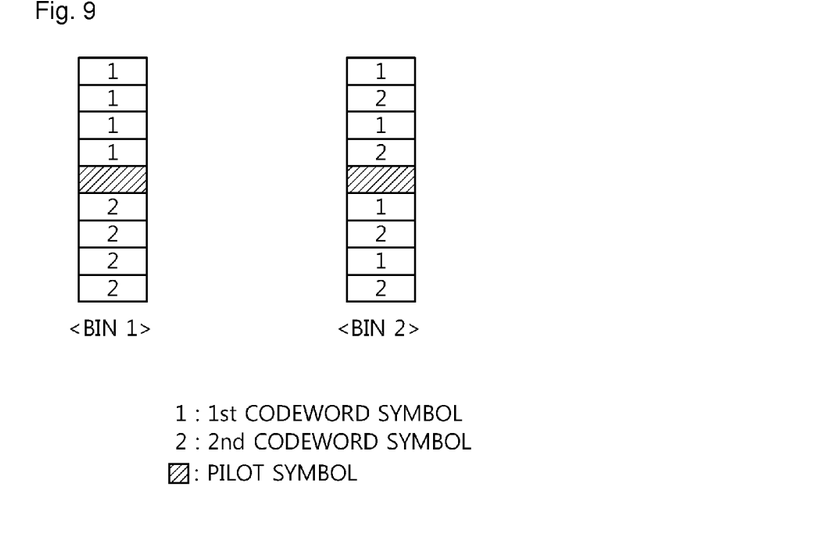
FIG. 9 shows a method for allocating a codeword symbol and a pilot symbol to subcarriers of a bin according to an embodiment of the present invention.

FIG. 9 shows a method for allocating a codeword symbol and a pilot symbol to subcarriers of a bin according to an embodiment of the present invention. A time axis represents one OFDM symbol. A frequency axis represents a subcarrier unit. The bin has a structure of 9×1 (i.e., the number of subcarriers×the number of OFDM symbols).

Referring to FIG. 9, in each of bins 1 and 2, a 5th subcarrier is assigned to a pilot symbol. Four of the remaining subcarriers are assigned to 1st codeword symbols, and the other four subcarriers are assigned to 2nd codeword symbols.

In the bin 1, four consecutive subcarriers from the top are assigned to the 1st codeword symbols, and four consecutive subcarriers from the bottom are assigned to the 2nd codeword symbols. In the bin 2, subcarriers are alternately allocated to the 1st and 2nd codeword symbols from the top.

Figure 10:
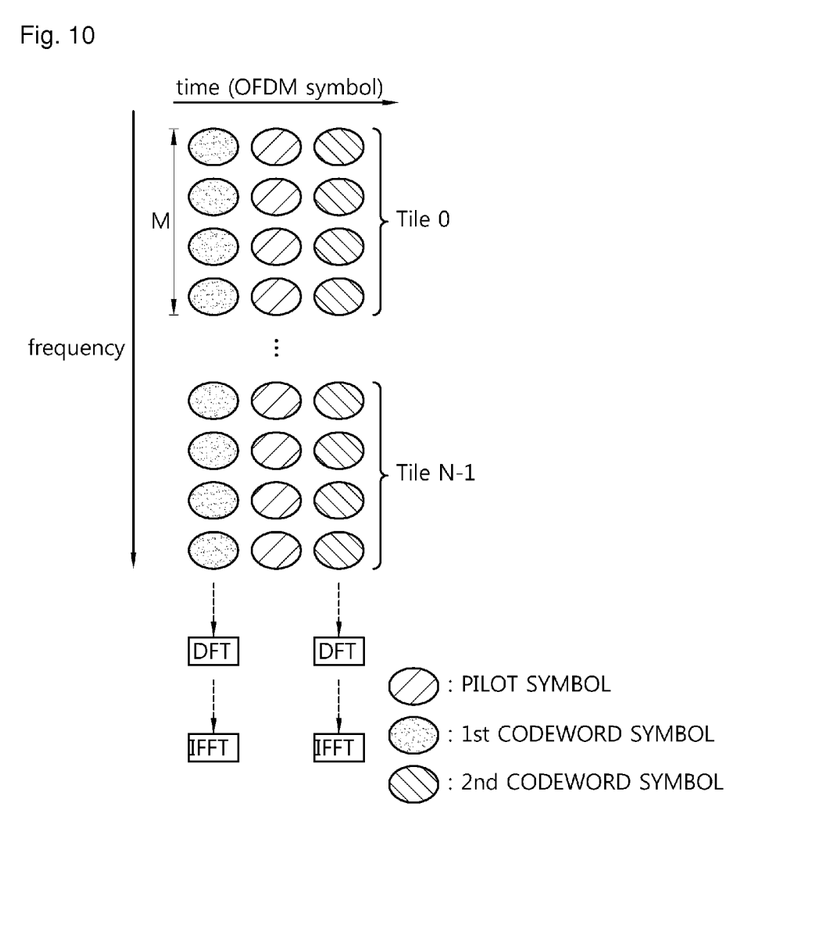
FIG. 10 shows DFT and IFFT methods according to an embodiment of the present invention.

FIG. 10 shows DFT and IFFT methods according to an embodiment of the present invention. A plurality of tiles constituting a subchannel or a resource block are physically contiguous to each other on a frequency axis. Herein, SC-FDMA or OFDMA is used as a multiple access scheme.

Referring to FIG. 10, tiles 0 to N−1 are consecutively contiguous on the frequency axis. M denotes the number of subcarriers included in one OFDM symbol of each tile. Each tile has the structure of FIG. 6. A transmitter assigns data to subcarriers of each tile according to the tile structure of FIG. 6.

In case of using the SC-FDMA scheme, the number of subcarriers included in 1st OFDM symbols of the contiguous tiles 0 to N−1 is N×M in total. Therefore, the transmitter converts N×M subcarriers in an assigned frequency band into frequency-domain signals by performing DFT, and converts the frequency-domain signals into time-domain signals by performing IFFT throughout the entire frequency band.

In case of using the OFDMA scheme, unlike in the case of using the SC-FDMA scheme, the transmitter can directly convert the N×M subcarriers into time-domain signals by performing IFFT without performing DFT.

When the IFFT is performed after every OFDM symbol is DFT-spread in this manner, a low peak-to-average power ration (PAPR) property can be maintained. The tile may have not only the structure of FIG. 6 but also the structure of FIG. 7. Of course, other structures may also be used according to systems.

Figure 11:
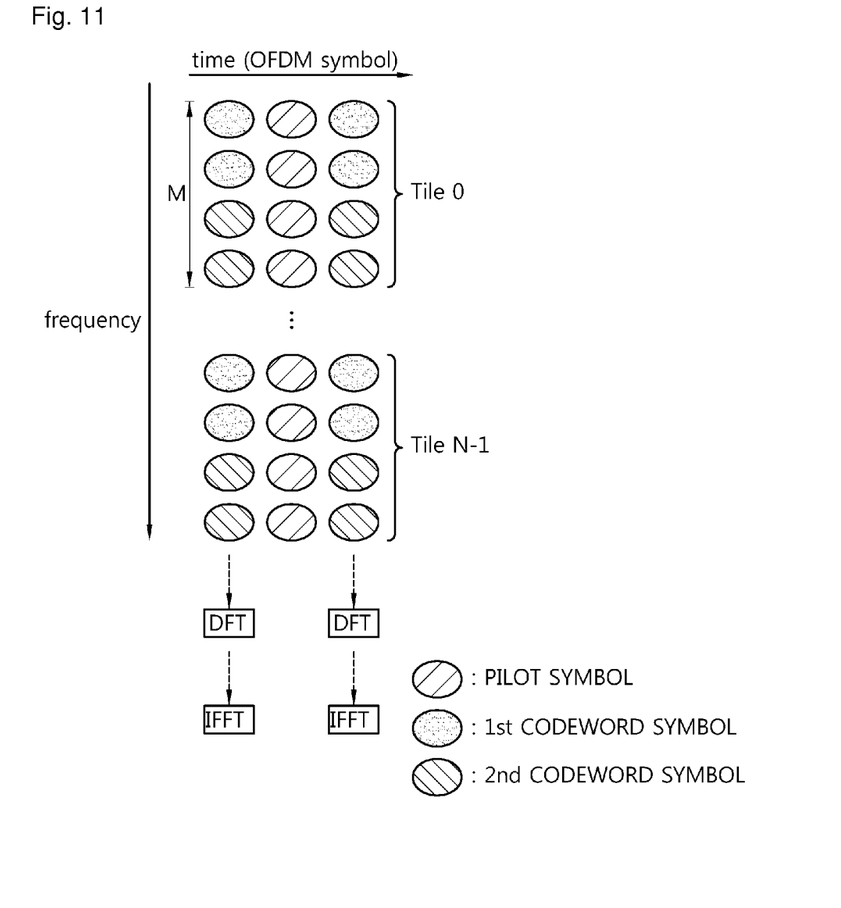
FIG. 11 shows DFT and IFFT methods according to another embodiment of the present invention.

FIG. 11 shows DFT and IFFT methods according to another embodiment of the present invention. This is an example of the DFT and IFFT methods using the tile structure of FIG. 7. The DFT and IFFT methods according to the embodiment of FIG. 11 are the same as those of FIG. 10. A difference between the two embodiments only lies in a tile structure.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for transmitting a codeword through a subchannel consisting of a plurality of tiles in a wireless communication system in which one tile comprises a plurality of data subcarriers and at least one pilot subcarrier, the method comprising:

generating a codeword by assigning pilot symbols to the at least one pilot subcarrier in each tile of the plurality of tiles, by assigning a first codeword symbol to some of the plurality of data subcarriers in each tile of the plurality of tiles, and by assigning a second codeword symbol to the remaining data subcarriers in each tile of the plurality of tiles; and transmitting the codeword, wherein each of the first codeword symbol and the second codeword symbol has a phase value among equal or more than 4 phase values, and wherein the each tile of the plurality of tiles is identified by the first codeword symbol and the second codeword symbol included in the each tile of the plurality of tiles, and a bits-value of the codeword is determined by a combination of the plurality of tiles.

2. The method of claim 1, wherein the subchannel consists of six tiles, the codeword has a size of 6 bits, the 64 bits-values of the codeword are generated by mapping to combinations of the six tiles consisting of the first and second codeword symbols as expressed by the following table, and the first and second codeword symbols P(k) are obtained according to an equation expressed by equation below, $$P(k) = e^{\left(j\frac{\pi k}{4}\right)}, k = 1, 2, \ldots, 8$$

where the table is:

| Tile 0 | | Tile 1 | | Tile 2 | | Tile 3 | | Tile 4 | | Tile 5 | |
|---|---|---|---|---|---|---|---|---|---|---|---|
| P(8) | P(5) | P(8) | P(1) | P(7) | P(1) | P(3) | P(3) | P(7) | P(4) | P(4) | P(3) |
| P(2) | P(2) | P(2) | P(1) | P(6) | P(5) | P(3) | P(8) | P(8) | P(3) | P(3) | P(1) |
| P(5) | P(5) | P(5) | P(6) | P(8) | P(5) | P(3) | P(1) | P(2) | P(1) | P(4) | P(8) |
| P(2) | P(7) | P(8) | P(7) | P(6) | P(2) | P(4) | P(6) | P(3) | P(2) | P(3) | P(3) |
| P(6) | P(2) | P(3) | P(5) | P(8) | P(4) | P(4) | P(3) | P(6) | P(2) | P(5) | P(4) |
| P(8) | P(6) | P(6) | P(1) | P(1) | P(8) | P(1) | P(3) | P(4) | P(2) | P(6) | P(8) |
| P(4) | P(4) | P(8) | P(1) | P(8) | P(4) | P(7) | P(5) | P(6) | P(3) | P(7) | P(6) |
| P(1) | P(6) | P(1) | P(3) | P(6) | P(4) | P(7) | P(3) | P(1) | P(6) | P(8) | P(7) |
| P(8) | P(4) | P(1) | P(1) | P(3) | P(4) | P(1) | P(7) | P(3) | P(1) | P(5) | P(2) |
| P(1) | P(7) | P(1) | P(2) | P(4) | P(1) | P(3) | P(8) | P(6) | P(1) | P(1) | P(8) |
| P(8) | P(3) | P(4) | P(5) | P(6) | P(8) | P(2) | P(7) | P(6) | P(5) | P(1) | P(2) |
| P(2) | P(1) | P(4) | P(7) | P(6) | P(2) | P(6) | P(3) | P(3) | P(8) | P(6) | P(7) |
| P(3) | P(2) | P(5) | P(4) | P(8) | P(5) | P(6) | P(6) | P(8) | P(5) | P(1) | P(1) |
| P(7) | P(1) | P(5) | P(3) | P(1) | P(1) | P(2) | P(2) | P(2) | P(4) | P(3) | P(5) |
| P(6) | P(3) | P(2) | P(4) | P(3) | P(7) | P(7) | P(7) | P(8) | P(1) | P(7) | P(7) |
| P(8) | P(2) | P(1) | P(4) | P(3) | P(4) | P(2) | P(4) | P(7) | P(4) | P(7) | P(1) |
| P(3) | P(4) | P(7) | P(8) | P(2) | P(6) | P(6) | P(3) | P(2) | P(1) | P(1) | P(1) |
| P(3) | P(6) | P(6) | P(4) | P(6) | P(1) | P(6) | P(1) | P(2) | P(4) | P(1) | P(3) |
| P(3) | P(3) | P(5) | P(7) | P(4) | P(5) | P(7) | P(6) | P(4) | P(4) | P(5) | P(3) |
| P(3) | P(3) | P(8) | P(4) | P(4) | P(8) | P(6) | P(4) | P(8) | P(7) | P(5) | P(3) |
| P(3) | P(4) | P(2) | P(5) | P(1) | P(1) | P(7) | P(3) | P(5) | P(4) | P(3) | P(5) |
| P(6) | P(5) | P(2) | P(1) | P(5) | P(4) | P(5) | P(8) | P(4) | P(5) | P(8) | P(1) |

-continued

| Tile 0 | | Tile 1 | | Tile 2 | | Tile 3 | | Tile 4 | | Tile 5 | |
|---|---|---|---|---|---|---|---|---|---|---|---|
| P(2) | P(8) | P(1) | P(3) | P(8) | P(7) | P(6) | P(8) | P(8) | P(3) | P(6) | P(5) |
| P(8) | P(8) | P(5) | P(7) | P(2) | P(5) | P(3) | P(5) | P(8) | P(8) | P(2) | P(8) |
| P(4) | P(7) | P(2) | P(7) | P(4) | P(5) | P(3) | P(7) | P(6) | P(7) | P(5) | P(7) |
| P(5) | P(7) | P(7) | P(4) | P(3) | P(4) | P(8) | P(2) | P(7) | P(1) | P(2) | P(7) |
| P(8) | P(8) | P(5) | P(6) | P(2) | P(1) | P(6) | P(4) | P(6) | P(5) | P(8) | P(5) |
| P(6) | P(8) | P(5) | P(1) | P(5) | P(8) | P(5) | P(2) | P(6) | P(5) | P(3) | P(8) |
| P(4) | P(1) | P(8) | P(1) | P(7) | P(7) | P(8) | P(3) | P(6) | P(7) | P(7) | P(4) |
| P(3) | P(4) | P(8) | P(3) | P(3) | P(3) | P(2) | P(5) | P(5) | P(7) | P(1) | P(4) |
| P(5) | P(1) | P(4) | P(5) | P(7) | P(7) | P(4) | P(4) | P(4) | P(8) | P(1) | P(1) |
| P(6) | P(5) | P(7) | P(6) | P(3) | P(6) | P(2) | P(2) | P(5) | P(5) | P(3) | P(4) |
| P(6) | P(5) | P(4) | P(7) | P(6) | P(4) | P(6) | P(6) | P(8) | P(5) | P(1) | P(4) |
| P(8) | P(8) | P(2) | P(2) | P(7) | P(3) | P(7) | P(5) | P(6) | P(8) | P(2) | P(2) |
| P(4) | P(6) | P(6) | P(7) | P(2) | P(2) | P(8) | P(8) | P(8) | P(4) | P(5) | P(5) |
| P(5) | P(8) | P(8) | P(7) | P(1) | P(7) | P(3) | P(6) | P(5) | P(3) | P(1) | P(6) |
| P(2) | P(7) | P(4) | P(4) | P(1) | P(1) | P(2) | P(4) | P(8) | P(7) | P(7) | P(2) |
| P(5) | P(5) | P(1) | P(3) | P(6) | P(7) | P(4) | P(5) | P(4) | P(1) | P(6) | P(5) |
| P(8) | P(3) | P(5) | P(1) | P(7) | P(2) | P(5) | P(6) | P(2) | P(5) | P(8) | P(6) |
| P(6) | P(2) | P(8) | P(7) | P(5) | P(8) | P(7) | P(1) | P(5) | P(2) | P(5) | P(2) |
| P(8) | P(1) | P(5) | P(3) | P(4) | P(4) | P(8) | P(1) | P(4) | P(1) | P(8) | P(4) |
| P(6) | P(4) | P(6) | P(4) | P(5) | P(3) | P(8) | P(4) | P(5) | P(6) | P(5) | P(7) |
| P(7) | P(3) | P(7) | P(3) | P(4) | P(5) | P(5) | P(6) | P(5) | P(3) | P(2) | P(6) |
| P(8) | P(5) | P(2) | P(8) | P(3) | P(5) | P(4) | P(2) | P(1) | P(4) | P(5) | P(6) |
| P(3) | P(6) | P(3) | P(3) | P(2) | P(4) | P(7) | P(7) | P(3) | P(7) | P(3) | P(6) |
| P(1) | P(3) | P(8) | P(8) | P(1) | P(2) | P(1) | P(8) | P(8) | P(8) | P(2) | P(5) |
| P(4) | P(6) | P(3) | P(3) | P(6) | P(8) | P(2) | P(1) | P(8) | P(7) | P(4) | P(5) |
| P(8) | P(6) | P(6) | P(1) | P(1) | P(6) | P(6) | P(7) | P(7) | P(7) | P(6) | P(2) |
| P(7) | P(7) | P(4) | P(6) | P(2) | P(8) | P(7) | P(1) | P(3) | P(7) | P(4) | P(2) |
| P(1) | P(2) | P(2) | P(6) | P(3) | P(8) | P(4) | P(8) | P(3) | P(6) | P(2) | P(6) |
| P(8) | P(8) | P(3) | P(4) | P(6) | P(2) | P(3) | P(7) | P(2) | P(3) | P(6) | P(8) |
| P(4) | P(2) | P(8) | P(5) | P(6) | P(2) | P(3) | P(2) | P(1) | P(2) | P(8) | P(2) |
| P(3) | P(2) | P(6) | P(1) | P(1) | P(2) | P(3) | P(7) | P(3) | P(7) | P(4) | P(1) |
| P(1) | P(4) | P(6) | P(8) | P(5) | P(6) | P(8) | P(2) | P(7) | P(8) | P(7) | P(6) |
| P(1) | P(7) | P(3) | P(6) | P(5) | P(6) | P(8) | P(2) | P(4) | P(3) | P(2) | P(8) |
| P(1) | P(5) | P(5) | P(4) | P(4) | P(1) | P(7) | P(5) | P(1) | P(2) | P(2) | P(6) |
| P(3) | P(8) | P(3) | P(7) | P(5) | P(3) | P(8) | P(1) | P(7) | P(6) | P(8) | P(3) |
| P(3) | P(1) | P(6) | P(2) | P(5) | P(4) | P(3) | P(4) | P(1) | P(5) | P(5) | P(6) |
| P(6) | P(8) | P(3) | P(8) | P(5) | P(8) | P(2) | P(4) | P(8) | P(2) | P(7) | P(3) |
| P(5) | P(4) | P(4) | P(2) | P(2) | P(8) | P(4) | P(5) | P(6) | P(2) | P(4) | P(1) |
| P(1) | P(1) | P(7) | P(5) | P(7) | P(6) | P(8) | P(6) | P(5) | P(7) | P(4) | P(5) |
| P(6) | P(7) | P(3) | P(5) | P(1) | P(5) | P(1) | P(6) | P(3) | P(4) | P(7) | P(3) |
| P(6) | P(7) | P(7) | P(3) | P(5) | P(6) | P(3) | P(6) | P(1) | P(6) | P(1) | P(3) |
| P(6) | P(5) | P(2) | P(8) | P(8) | P(2) | P(2) | P(5) | P(2) | P(3) | P(2) | P(8) |

3. The method of claim 1, wherein the subchannel consists of six tiles, the codeword has a size of 6 bits, the 64 bits-values of the codeword are generated by mapping to combinations of the six tiles consisting of the first and second codeword symbols as expressed by the following table, and the first and second codeword symbols P(k) are obtained according to an equation expressed by $$P(k) = e^{\left(j\frac{\pi(2k-1)}{4}\right)}, k = 1, 2, 3, 4$$

where the table is:

| Tile 0 | | Tile 1 | | Tile 2 | | Tile 3 | | Tile 4 | | Tile 5 | |
|---|---|---|---|---|---|---|---|---|---|---|---|
| P(1) | P(4) | P(2) | P(4) | P(2) | P(3) | P(2) | P(1) | P(3) | P(1) | P(4) | P(1) |
| P(2) | P(3) | P(3) | P(1) | P(3) | P(3) | P(3) | P(4) | P(4) | P(3) | P(1) | P(1) |
| P(3) | P(1) | P(4) | P(3) | P(1) | P(1) | P(2) | P(1) | P(4) | P(1) | P(1) | P(1) |
| P(4) | P(2) | P(1) | P(2) | P(3) | P(2) | P(3) | P(2) | P(1) | P(1) | P(2) | P(3) |
| P(3) | P(3) | P(1) | P(2) | P(3) | P(4) | P(4) | P(2) | P(2) | P(1) | P(3) | P(1) |
| P(2) | P(2) | P(4) | P(2) | P(2) | P(1) | P(2) | P(3) | P(4) | P(3) | P(4) | P(2) |
| P(4) | P(3) | P(2) | P(3) | P(4) | P(3) | P(2) | P(2) | P(3) | P(4) | P(1) | P(3) |
| P(1) | P(2) | P(2) | P(3) | P(1) | P(3) | P(3) | P(3) | P(2) | P(2) | P(3) | P(2) |
| P(4) | P(1) | P(1) | P(4) | P(3) | P(4) | P(2) | P(1) | P(2) | P(3) | P(4) | P(2) |
| P(4) | P(4) | P(4) | P(2) | P(1) | P(1) | P(2) | P(3) | P(1) | P(4) | P(3) | P(1) |
| P(1) | P(4) | P(1) | P(3) | P(3) | P(3) | P(4) | P(2) | P(4) | P(3) | P(1) | P(1) |
| P(1) | P(1) | P(3) | P(3) | P(4) | P(2) | P(2) | P(4) | P(2) | P(2) | P(1) | P(1) |
| P(2) | P(4) | P(3) | P(2) | P(4) | P(1) | P(2) | P(1) | P(3) | P(3) | P(4) | P(4) |
| P(3) | P(2) | P(2) | P(4) | P(1) | P(3) | P(3) | P(4) | P(2) | P(1) | P(2) | P(4) |
| P(2) | P(4) | P(4) | P(2) | P(1) | P(1) | P(4) | P(4) | P(3) | P(2) | P(3) | P(1) |
| P(4) | P(2) | P(4) | P(4) | P(1) | P(3) | P(3) | P(3) | P(2) | P(4) | P(4) | P(4) |
| P(3) | P(4) | P(2) | P(2) | P(1) | P(2) | P(1) | P(4) | P(4) | P(2) | P(2) | P(3) |
| P(2) | P(1) | P(1) | P(4) | P(4) | P(2) | P(2) | P(2) | P(1) | P(4) | P(2) | P(1) |
| P(2) | P(4) | P(3) | P(4) | P(3) | P(2) | P(4) | P(1) | P(1) | P(2) | P(3) | P(3) |
| P(4) | P(3) | P(4) | P(1) | P(1) | P(2) | P(4) | P(2) | P(4) | P(3) | P(3) | P(3) |

-continued

| Tile 0 | | Tile 1 | | Tile 2 | | Tile 3 | | Tile 4 | | Tile 5 | |
|---|---|---|---|---|---|---|---|---|---|---|---|
| P(2) | P(2) | P(1) | P(4) | P(2) | P(4) | P(2) | P(4) | P(1) | P(4) | P(1) | P(4) |
| P(3) | P(3) | P(4) | P(1) | P(2) | P(4) | P(3) | P(4) | P(2) | P(1) | P(2) | P(3) |
| P(1) | P(3) | P(4) | P(4) | P(1) | P(4) | P(3) | P(2) | P(1) | P(1) | P(1) | P(2) |
| P(1) | P(1) | P(3) | P(1) | P(4) | P(1) | P(1) | P(2) | P(4) | P(2) | P(2) | P(1) |
| P(1) | P(1) | P(4) | P(2) | P(4) | P(4) | P(1) | P(3) | P(2) | P(3) | P(4) | P(3) |
| P(4) | P(2) | P(2) | P(4) | P(2) | P(1) | P(4) | P(4) | P(1) | P(1) | P(4) | P(2) |
| P(3) | P(3) | P(1) | P(3) | P(2) | P(2) | P(3) | P(4) | P(4) | P(4) | P(3) | P(4) |
| P(3) | P(1) | P(3) | P(1) | P(2) | P(2) | P(1) | P(3) | P(1) | P(4) | P(1) | P(1) |
| P(3) | P(2) | P(4) | P(3) | P(3) | P(4) | P(4) | P(3) | P(1) | P(3) | P(1) | P(2) |
| P(2) | P(2) | P(2) | P(3) | P(4) | P(1) | P(1) | P(1) | P(1) | P(3) | P(4) | P(2) |
| P(1) | P(3) | P(3) | P(1) | P(2) | P(1) | P(2) | P(1) | P(2) | P(4) | P(2) | P(1) |
| P(3) | P(1) | P(2) | P(4) | P(3) | P(1) | P(3) | P(1) | P(3) | P(2) | P(2) | P(4) |
| P(2) | P(3) | P(1) | P(1) | P(1) | P(1) | P(2) | P(3) | P(3) | P(2) | P(3) | P(2) |
| P(1) | P(3) | P(1) | P(1) | P(3) | P(3) | P(1) | P(1) | P(4) | P(2) | P(2) | P(3) |
| P(1) | P(2) | P(4) | P(4) | P(4) | P(1) | P(2) | P(4) | P(3) | P(1) | P(4) | P(3) |
| P(1) | P(1) | P(1) | P(2) | P(1) | P(4) | P(3) | P(1) | P(4) | P(4) | P(3) | P(3) |
| P(2) | P(1) | P(4) | P(3) | P(2) | P(3) | P(4) | P(1) | P(2) | P(1) | P(1) | P(4) |
| P(1) | P(3) | P(2) | P(4) | P(3) | P(1) | P(2) | P(3) | P(1) | P(2) | P(1) | P(3) |
| P(1) | P(4) | P(4) | P(3) | P(2) | P(1) | P(4) | P(4) | P(4) | P(1) | P(2) | P(2) |
| P(4) | P(4) | P(3) | P(1) | P(3) | P(3) | P(4) | P(3) | P(2) | P(2) | P(1) | P(4) |
| P(3) | P(1) | P(4) | P(1) | P(3) | P(3) | P(3) | P(1) | P(4) | P(1) | P(4) | P(2) |
| P(1) | P(1) | P(2) | P(3) | P(3) | P(1) | P(1) | P(4) | P(2) | P(4) | P(2) | P(3) |
| P(2) | P(3) | P(1) | P(2) | P(2) | P(1) | P(3) | P(2) | P(2) | P(3) | P(1) | P(4) |
| P(4) | P(1) | P(3) | P(3) | P(2) | P(3) | P(3) | P(1) | P(3) | P(3) | P(2) | P(2) |
| P(1) | P(3) | P(4) | P(4) | P(3) | P(2) | P(1) | P(3) | P(1) | P(1) | P(3) | P(1) |
| P(2) | P(4) | P(1) | P(1) | P(2) | P(3) | P(3) | P(2) | P(1) | P(3) | P(3) | P(2) |
| P(2) | P(4) | P(3) | P(2) | P(2) | P(4) | P(1) | P(2) | P(4) | P(4) | P(2) | P(4) |
| P(4) | P(3) | P(4) | P(1) | P(4) | P(3) | P(1) | P(4) | P(2) | P(4) | P(1) | P(2) |
| P(2) | P(4) | P(3) | P(3) | P(1) | P(2) | P(4) | P(2) | P(2) | P(3) | P(2) | P(1) |
| P(4) | P(3) | P(3) | P(4) | P(2) | P(4) | P(1) | P(3) | P(3) | P(4) | P(3) | P(2) |
| P(4) | P(1) | P(1) | P(4) | P(1) | P(4) | P(1) | P(4) | P(3) | P(2) | P(1) | P(4) |
| P(3) | P(4) | P(1) | P(2) | P(4) | P(3) | P(2) | P(4) | P(1) | P(2) | P(4) | P(1) |
| P(2) | P(1) | P(2) | P(2) | P(4) | P(3) | P(3) | P(2) | P(3) | P(1) | P(1) | P(1) |
| P(4) | P(2) | P(3) | P(2) | P(4) | P(4) | P(1) | P(4) | P(4) | P(1) | P(3) | P(4) |
| P(1) | P(2) | P(3) | P(2) | P(1) | P(3) | P(4) | P(1) | P(1) | P(4) | P(4) | P(1) |
| P(3) | P(4) | P(1) | P(1) | P(4) | P(1) | P(4) | P(2) | P(3) | P(4) | P(1) | P(2) |
| P(2) | P(3) | P(2) | P(2) | P(3) | P(4) | P(4) | P(4) | P(3) | P(2) | P(4) | P(3) |
| P(4) | P(3) | P(1) | P(1) | P(3) | P(1) | P(1) | P(4) | P(4) | P(3) | P(4) | P(1) |
| P(3) | P(1) | P(2) | P(3) | P(3) | P(3) | P(1) | P(1) | P(4) | P(4) | P(4) | P(4) |
| P(2) | P(1) | P(1) | P(1) | P(1) | P(2) | P(1) | P(1) | P(2) | P(1) | P(3) | P(3) |
| P(3) | P(4) | P(4) | P(4) | P(1) | P(2) | P(2) | P(1) | P(2) | P(3) | P(1) | P(3) |
| P(2) | P(1) | P(2) | P(1) | P(1) | P(4) | P(3) | P(4) | P(1) | P(2) | P(1) | P(2) |
| P(1) | P(1) | P(2) | P(3) | P(1) | P(2) | P(4) | P(3) | P(4) | P(1) | P(4) | P(4) |
| P(1) | P(1) | P(1) | P(1) | P(3) | P(1) | P(3) | P(3) | P(2) | P(1) | P(4) | P(1) |

4. The method of claim 1, wherein, if the subchannel consists of the six tiles, the codeword has a size of 6 bits, and modulations for the codeword 000000 to 111111 are respectively w0 to w63, then the following relation is satisfied: $w_{i+16}=-w_i$, $w_{i+32}=jw_i$, $w_{i+48}=-jw_i$, $i=0, 1, 2, \ldots, 15$.

5. The method of claim 1, wherein the number of the data subcarriers assigned with the first codeword symbol and the number of the data subcarriers assigned with the second codeword symbol have a ratio of 1:1.

* * * * *